US012644328B2

(12) United States Patent
Fu et al.

(10) Patent No.: US 12,644,328 B2
(45) Date of Patent: Jun. 2, 2026

(54) TENSIONER FOR WINDOW REGULATOR

(71) Applicants: INTEVA PRODUCTS, LLC, Troy, MI (US); INTEVA PRODUCTS ZHENJIANG CO., LTD, Zhenjiang (CN)

(72) Inventors: Qiangxi Fu, Zhenjiang (CN); Sun Liang, Zhenjiang (CN); Yifan Fan, Zhenjiang (CN)

(73) Assignees: INTEVA PRODUCTS, LLC, Troy, MI (US); INTEVA PRODUCTS ZHENGJIANG CO., LTD, Zhengjiang (CN)

( * ) Notice: Subject to any disclaimer, the term of this patent is extended or adjusted under 35 U.S.C. 154(b) by 0 days.

(21) Appl. No.: 19/039,425

(22) Filed: Jan. 28, 2025

(65) Prior Publication Data

US 2025/0243705 A1 Jul. 31, 2025

(30) Foreign Application Priority Data

Jan. 29, 2024 (CN) ......................... 202410124780.4
Jan. 29, 2024 (CN) ......................... 202420215143.3

(51) Int. Cl.
*E05F 15/689* (2015.01)

(52) U.S. Cl.
CPC ....... *E05F 15/6911* (2024.01); *E05Y 2600/14* (2013.01)

(58) Field of Classification Search
CPC ............................ E05F 11/485; E05F 15/6911
See application file for complete search history.

(56) References Cited

U.S. PATENT DOCUMENTS

| | | | | | |
|---|---|---|---|---|---|
| 4,235,046 | A * | 11/1980 | Hess | E05F 11/485 | 49/352 |
| 4,313,282 | A * | 2/1982 | Hagemann | E05F 11/485 | 49/352 |
| 4,657,523 | A * | 4/1987 | Chevance | E05F 11/485 | 49/352 |
| 5,746,094 | A * | 5/1998 | Medebach | F16C 1/26 | 74/501.5 R |
| 5,749,174 | A * | 5/1998 | Mariel | E05F 11/485 | 49/352 |
| 5,857,635 | A * | 1/1999 | Klippert | E05F 11/485 | 242/407 |
| 5,950,365 | A * | 9/1999 | Lieb | B60J 1/17 | 49/352 |

(Continued)

FOREIGN PATENT DOCUMENTS

| | | | | |
|---|---|---|---|---|
| DE | 3737733 C1 * | 5/1988 | E05F 11/485 |
| DE | 19603893 C1 * | 11/1996 | E05F 11/485 |

(Continued)

*Primary Examiner* — Catherine A Kelly
(74) *Attorney, Agent, or Firm* — CANTOR COLBURN LLP

(57) ABSTRACT

A tensioner for a window regulator for raising and lowering a window of a vehicle, including: a first tensioner support; a second tensioner support; a spring disposed between the first tensioner support and the second tensioner support; and an adjusting sleeve configured to engage features of the first tensioner support as the second tensioner support is moved away from the first tensioner support due to a biasing force of the spring.

18 Claims, 23 Drawing Sheets

Single Lift Frameless Window Regulator

(56) References Cited

U.S. PATENT DOCUMENTS

| | | | | | |
|---|---|---|---|---|---|
| 6,093,892 | A * | 7/2000 | Arimoto | F16C 1/226 | 174/84 R |
| 6,131,482 | A * | 10/2000 | Klippert | F16C 1/226 | 74/502.6 |
| 6,202,351 | B1 * | 3/2001 | Medebach | E05F 11/485 | 49/352 |
| 6,272,948 | B1 * | 8/2001 | Klippert | E05F 11/485 | 74/502 |
| 7,325,360 | B2 * | 2/2008 | Mazouzi | E05F 11/485 | 254/231 |
| 7,472,515 | B2 * | 1/2009 | Mazouzi | E05F 11/485 | 49/352 |
| 7,866,229 | B2 * | 1/2011 | Casalini | F16C 1/226 | 74/501.5 R |
| 8,555,549 | B2 * | 10/2013 | Cardine | F16G 11/12 | 49/352 |
| 8,819,995 | B2 * | 9/2014 | Kinoshita | E05F 11/485 | 49/352 |
| 10,329,825 | B2 * | 6/2019 | Koike | B60J 1/17 | |
| 2005/0016070 | A1 * | 1/2005 | Cardine | F16G 11/12 | 49/352 |
| 2010/0043295 | A1 * | 2/2010 | Barr | E05F 11/485 | 49/352 |
| 2024/0426157 | A1 * | 12/2024 | Krishnaiah | E05F 15/6911 | |

FOREIGN PATENT DOCUMENTS

| | | | | |
|---|---|---|---|---|
| DE | 102006026460 | A1 * | 12/2007 | E05F 15/689 |
| DE | 102007048173 | A1 * | 4/2008 | E05F 11/485 |
| DE | 202008011934 | U1 * | 2/2010 | E05F 11/485 |
| DE | 102018204446 | A1 * | 9/2019 | E05F 15/689 |
| EP | 0658696 | A1 * | 6/1995 | E05F 11/485 |
| EP | 2228553 | A1 * | 9/2010 | F16C 1/267 |
| KR | 20240123510 | A * | 8/2024 | E05F 15/6916 |

* cited by examiner

Double Lift Frameless Window Regulator

Single Lift Frameless Window Regulator

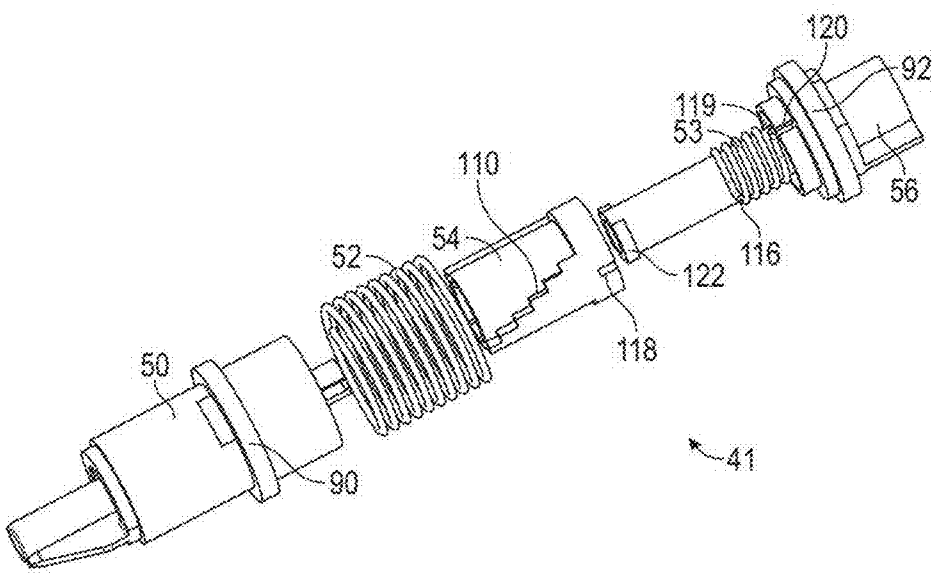
FIG. 12
Tensioner Support
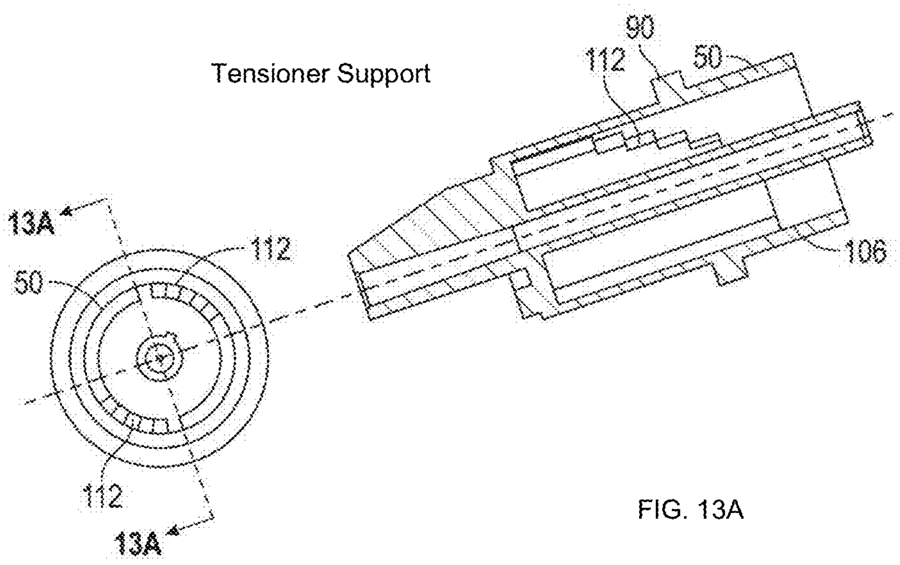
FIG. 13A
FIG. 13

TENSIONER FOR WINDOW REGULATOR

CROSS REFERENCE TO RELATED APPLICATIONS

This application claims application claims priority under 35 U.S.C. § 119 to the following Chinese Patent Application No. 202410124780.4 filed on Jan. 29, 2024; and Chinese Utility Model application No. 202420215143.3 filed on Jan. 29, 2024, the contents each of which are incorporated herein by reference thereto.

TECHNICAL FIELD

Exemplary embodiments pertain to the art of vehicles, and more particularly to tensioners for vehicle window regulators.

BACKGROUND

Passenger vehicles typically have windows surrounding the passenger compartment. Windows in doors of the vehicle may be designed to be raised and lowered electrically by an operator. The operator may be the driver or a passenger usually using an interior switch. The physical raising and lowering of a window are performed by an electromechanical device referred to as a window regulator.

The window regulator includes a drive unit (motor) connected to a drive device (such as cable or belt) that transmits a drive force to the window regulator. The window may be driven by slides or cursors that are moveable along tracks or guide rails under the action of the cable. The cable may be split into a lower cable and an upper cable wound in opposite directions on a drum driven by the motor.

The tension in the cable or cables in the window regulator must be effectively controlled. Slack in the cable or cables leads to inaccuracy in the operation of the window regulator and inaccuracy in the position of the slides or cursors relative to the position of the drum winding the cable. On the other hand, over tension in the cable can cause low efficiency and prematurely wear the window regulator components.

The operating accuracy of the window regulator is important, especially for a window regulator utilized in a frameless door. In a frameless car door, the glass top edge is engaged with the roof seal when it is fully closed.

The components of the window regulator device are subject to gradual aging, which can lead to elongation of the cable due to, for example, wear on the driving drum and the pulleys, the compression of the cable sleeves, or creep in the pulleys. Cable elongation due to aging of the various parts of the window regulator must be compensated for.

Moreover, when the window is being raised, the drive motor still applies torque to the window regulator device when the window reaches its upper limit. The over torque at the upper limit can cause elastic deformation of the window regulator components and cause elastic elongation of the cable and the other stressed units.

Play compensation mechanisms are employed to absorb the elongation of the cable and ensure sufficient tension for the correct operation of the window regulator device. However, these mechanisms comprise multiple components.

Thus, there is a need for a cable tensioner in a window regulator device that can effectively and efficiently absorb the elongation of the cable and ensure sufficient tension for the correct operation of the window regulator device.

BRIEF DESCRIPTION

Disclosed is a tensioner for a window regulator for raising and lowering a window of a vehicle, comprising: a first tensioner support; a second tensioner support; a spring disposed between the first tensioner support and the second tensioner support; and an adjusting sleeve configured to engage features of the first tensioner support as the second tensioner support is moved away from the first tensioner support due to a biasing force of the spring.

In addition to one or more of the features described above, or as an alternative to any of the foregoing embodiments, the features of the first tensioner support are a plurality of teeth and the adjusting sleeve has a plurality of arm portions each flexibly extending from a main body portion of the adjusting sleeve, each of the plurality of arm portions has a hook portion located at a distal end thereof.

In addition to one or more of the features described above, or as an alternative to any of the foregoing embodiments, each of the plurality of arm portions are separated by slots that receive features located between the plurality of teeth.

In addition to one or more of the features described above, or as an alternative to any of the foregoing embodiments, a respective one of features engages each hook portion of the plurality of arm portions such that the adjusting sleeve can be slid onto the first tensioner support and the adjusting sleeve is rotationally received on the first tensioner support until the adjusting sleeve is rotated and the slots receive features and the hook portion engages one of the plurality of teeth, the features when received within the slots prevent rotational movement of the adjusting sleeve with respect to the first tensioner support.

In addition to one or more of the features described above, or as an alternative to any of the foregoing embodiments, the adjusting sleeve is partially received within a cavity of the second tensioner support and the cavity defines a limit of movement of the plurality of arm portions away from the first tensioner support.

In addition to one or more of the features described above, or as an alternative to any of the foregoing embodiments, the adjusting sleeve is partially received within a cavity of the second tensioner support and the adjusting sleeve has a protrusion that is configured to slide within a recess located within an inner surface of the cavity of the second tensioner support, the sliding movement of the protrusion within recess defines a predefined range of movement between the second tensioner support and the adjusting sleeve before the tensioner irreversibly adjusts to a longer length.

In addition to one or more of the features described above, or as an alternative to any of the foregoing embodiments, the spring makes contact with a flange of the first tensioner support and a flange of the second tensioner support in order to bias the second tensioner support away from the first tensioner support.

In addition to one or more of the features described above, or as an alternative to any of the foregoing embodiments, the adjusting sleeve is rotationally received within an opening of the first tensioner support and the adjusting sleeve has a plurality of step features that engage complimentary step features located on an inner surface of opening.

In addition to one or more of the features described above, or as an alternative to any of the foregoing embodiments, the spring is a first spring and the adjusting sleeve is provided with a rotational biasing force by a second spring.

In addition to one or more of the features described above, or as an alternative to any of the foregoing embodiments, the second spring is a torsion spring and one end of the torsion spring engages an opening in the adjusting sleeve and an opposite end of the second spring engages an opening in the second tensioner support.

In addition to one or more of the features described above, or as an alternative to any of the foregoing embodiments, a portion of the second tensioner support has a key configuration that allows it to be inserted into and through an opening of the adjusting sleeve and thereafter rotational movement of the key configuration prevents the key configuration from sliding back into opening.

In addition to one or more of the features described above, or as an alternative to any of the foregoing embodiments, the adjusting sleeve is rotationally received within an opening of the first tensioner support and the adjusting sleeve has a plurality of step features that engage complimentary step features located on an inner surface of opening and a rotational force is applied to the adjusting sleeve by the spring.

In addition to one or more of the features described above, or as an alternative to any of the foregoing embodiments, one end of the spring engages an opening in the second tensioner support and an opposite end of the spring engages an elongated opening in the adjusting sleeve.

In addition to one or more of the features described above, or as an alternative to any of the foregoing embodiments, the adjusting sleeve is also rotationally received on the second tensioner support while a feature of the second tensioner support is slidably received within an elongated opening of the first tensioner support which allows for linear movement of the second tensioner support with respect to the first tensioner support while preventing rotational movement of the second tensioner support with respect to the first tensioner support.

In addition to one or more of the features described above, or as an alternative to any of the foregoing embodiments, further comprising a gasket secured to the first tensioner support and the adjusting sleeve is rotationally received within an opening of the first tensioner support and the adjusting sleeve has a plurality of step features that engage complimentary step features located on an inner surface of opening and where the gasket has a feature that slides within an elongated opening in a surface of the adjusting sleeve as the adjusting sleeve rotates with respect to the first tensioner support.

Also disclosed is a tensioner for a window regulator for raising and lowering a window of a vehicle, comprising: a first tensioner support; a second tensioner support; a spring disposed between the first tensioner support and the second tensioner support; an adjusting rack slidably mounted to a recessed area of the second tensioner support; and a spring biased tab portion mounted to the first tensioner support the spring biased tab portion configured to engage teeth of the adjusting rack in order to allow for an irreversible increase in the a length of the tensioner when an end of the adjusting rack contacts a wall of a recessed area.

In addition to one or more of the features described above, or as an alternative to any of the foregoing embodiments, the spring biased tab portion has an end that is received within an opening of the first tensioner support.

Further disclosed is a window regulator, comprising: at least one guide rail; at least one cursor slidably mounted to the at least one guide rail; at least cable operably coupled to the at least one cursor at one end and a cable drum at an opposite end; at least one cable sleeve surrounding the at least one cable, the at least one cable slidably received within the at least one cable sleeve; a motor mounted to a housing, the motor operably coupled to the cable drum such that operation of the motor will rotate the cable drum and cause movement of the at least one cursor along the at least one guide rail; a tensioner located between the housing and the at least one cable sleeve, the tensioner comprising: a first tensioner support; a second tensioner support; a spring disposed between the first tensioner support and the second tensioner support; and an adjusting sleeve configured to engage features of the first tensioner support as the second tensioner support is moved away the first tensioner support due to a biasing force of the spring.

BRIEF DESCRIPTION OF THE DRAWINGS

The following descriptions should not be considered limiting in any way. With reference to the accompanying drawings, like elements are numbered alike:

FIG. 12 is an exploded view of the tensioner illustrated in FIG. 8;

FIG. 13 is an end view of a first tensioner support illustrated in FIG. 12;

FIG. 13A is a cross sectional view along lines 13A-13A of FIG. 13;

DETAILED DESCRIPTION

A detailed description of one or more embodiments of the disclosed apparatus and methods are presented herein by way of exemplification and not limitation with reference to the Figures.

Disclosed herein is an apparatus for raising and lowering a window of a vehicle. The apparatus may be referred to as a "window regulator". In one or more embodiments, the window regulator is an electromechanical device that can be controlled by a user inside the vehicle such as by operating a switch.

Figure 1:
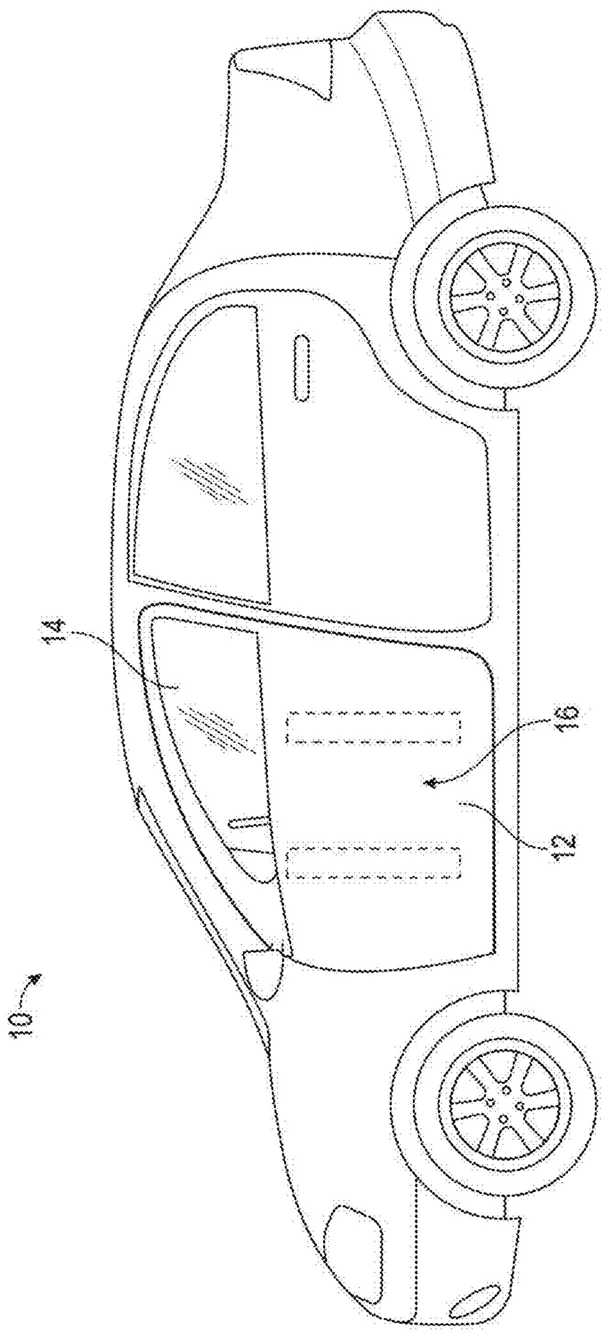
FIG. 1 is a partial view of a vehicle having a window regulator with a tensioner according to the present disclosure.

FIG. 1 is a partial side view of a vehicle 10 having at least one door 12 with a window 14 that is configured to be raised and lowered by a window regulator 16 disposed within door panels (e.g., exterior and interior) of the door 12. Although only one door 12 and window 14 is illustrated it is contemplated that the window regulator or the present disclosure can be used in a vehicle having numerous doors and associated windows. As such, one or more other windows 14 of the vehicle 10 may also be operated by a window regulator 16 according to the present disclosure. In one embodiment, the window regulator 16 is configured for raising and lowering a window with a frameless vehicle door.

Figure 2A:
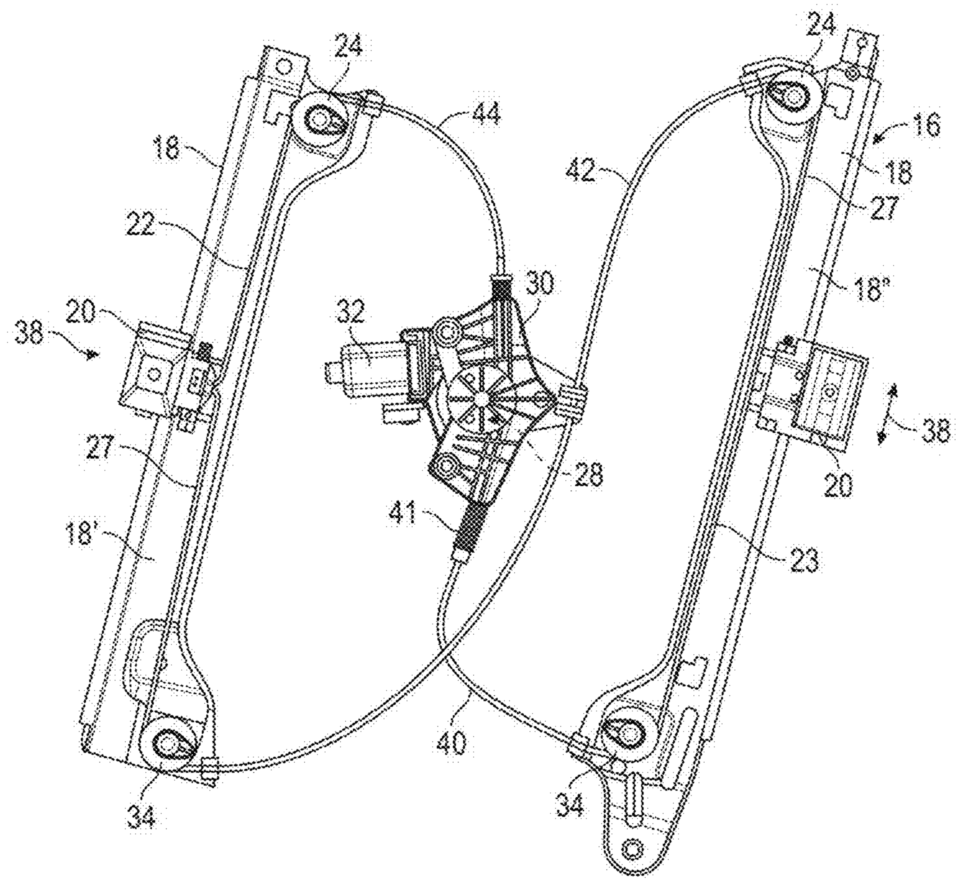
FIG. 2A is a view of a double lift window regulator with a tensioner according to the present disclosure.

FIG. 2A is a perspective view of the double lift window regulator 16. The window regulator 16 includes a pair of guide rails 18 each having a cursor 20 that is slidably secured to a respective guide rail 18 of the pair of guide rails 18. The pair of guide rails 18 may be referred to as a first guide rail 18' and a second guide rail 18". In the illustrated embodiment, the first guide rail 18' is located closer a forward portion of the vehicle or vehicle door than the second guide rail 18" when the window regulator 16 is secured to the vehicle door. As such, the second guide rail 18" is located closer a rear portion of the vehicle or vehicle door than the first guide rail 18' when the window regulator 16 is secured to the vehicle door. In addition, the corresponding cursor may be referred to as a first cursor 20 and a second cursor 20. Each cursor 20 is configured to be secured to the window 14 and each cursor 20 is operably coupled to at least one cable or a pair of cables.

Each one of the pair of guide rails 18 of the window regulator 16 may have an upper pulley or upper cam 24 that is secured to a top portion of each guide rail 18. As illustrated, the upper pulley or upper cam 24 is aligned with the guide rail 18. The upper pulley or upper cam is configured to receive either rotationally or slidably a cable. For example, a first cable 22 is secured to one of the pair of cursors 20 at one end and a cable drum 28 at an opposite end and a second cable 23 is secured to the other one of the pair of cursors 20 at one end and the cable drum 28 at an opposite end. In addition, a third cable 27 is secured to one of the pair of cursors 20 at one end and the other one of the pair of cursors 20 at an opposite end. Alternatively, and as mentioned above, only one cable secured to the cursors 20 and the drum 28.

Figure 2B:
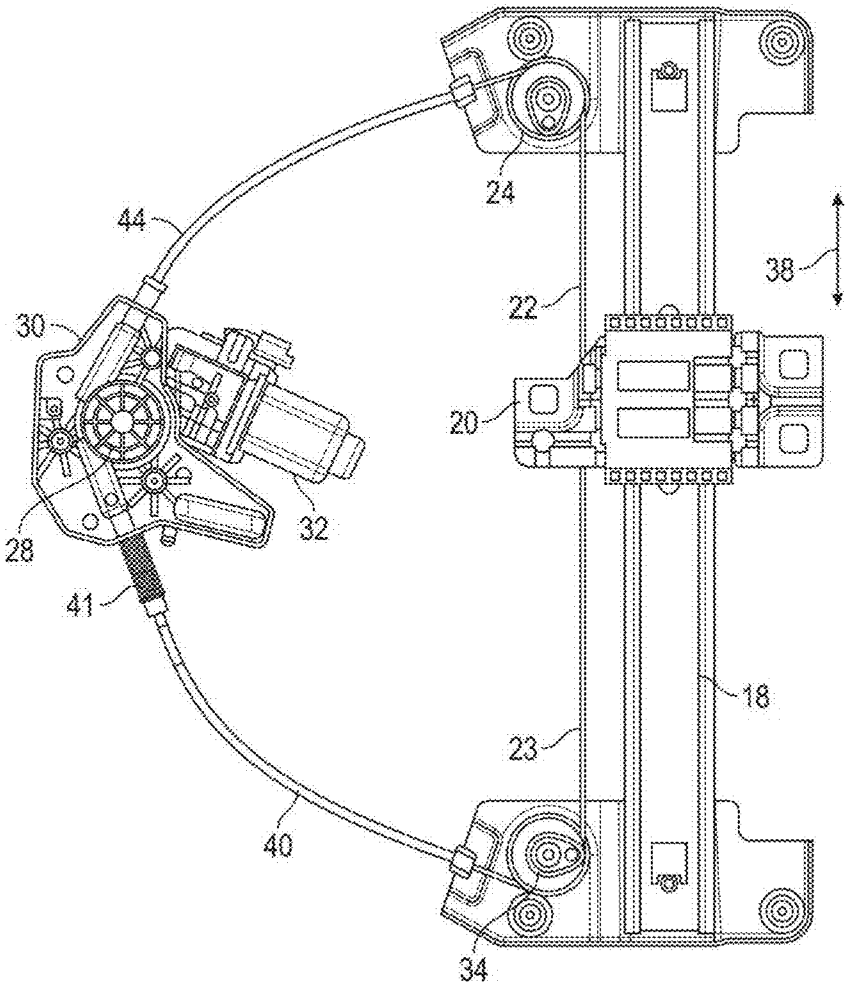
FIG. 2B is a view of a single lift window regulator with a tensioner according to the present disclosure.
Figure 3:
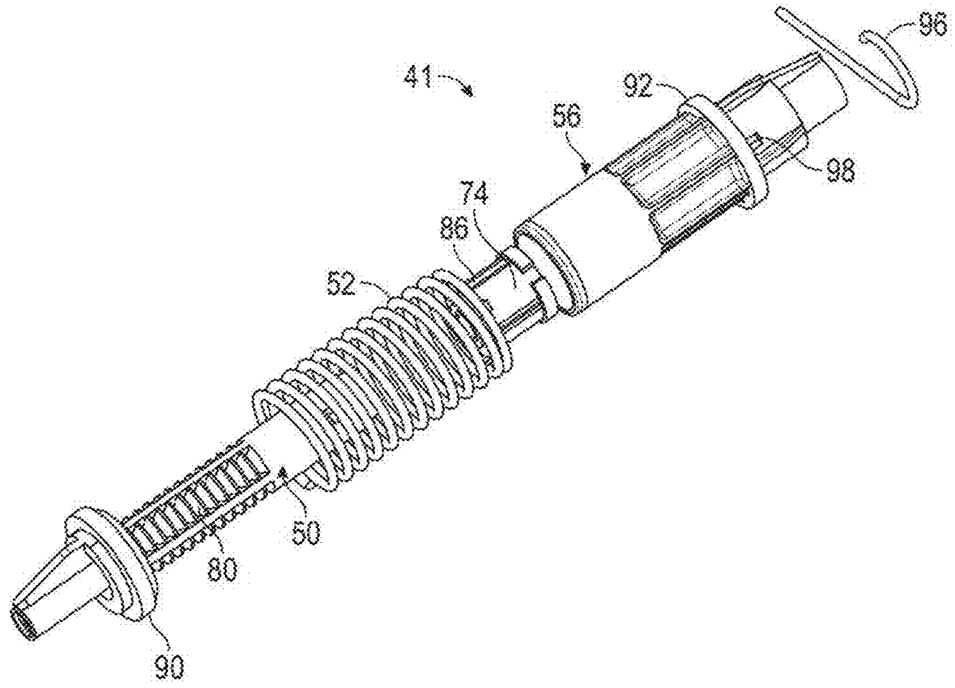
FIG. 3 is an exploded view of a tensioner according to an embodiment of the present disclosure.
Figure 3A:
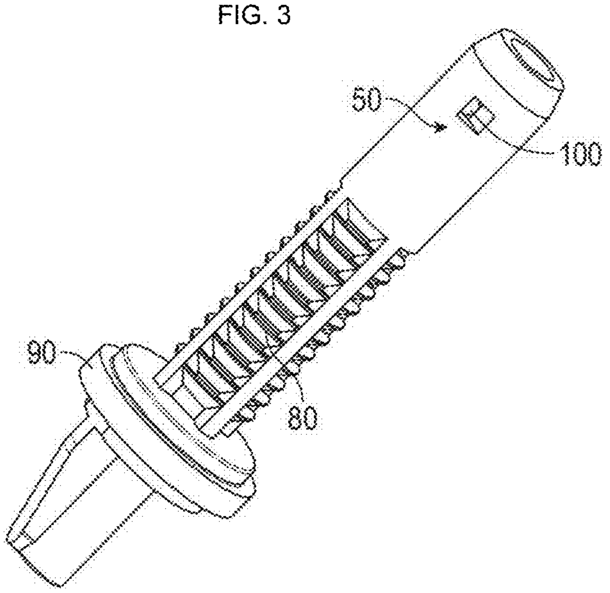
FIG. 3A is a perspective view of the tensioner support illustrated in at least FIG. 3.
Figure 3B:
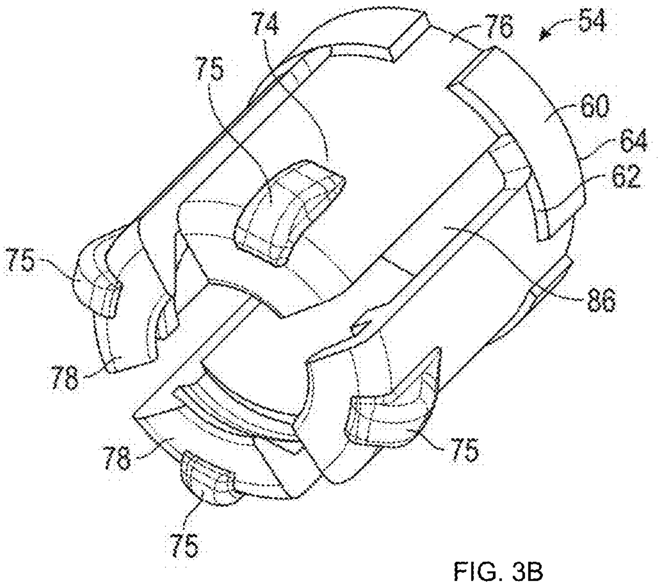
FIG. 3B is a perspective view of the adjusting sleeve illustrated in at least FIG. 3.
Figure 4:
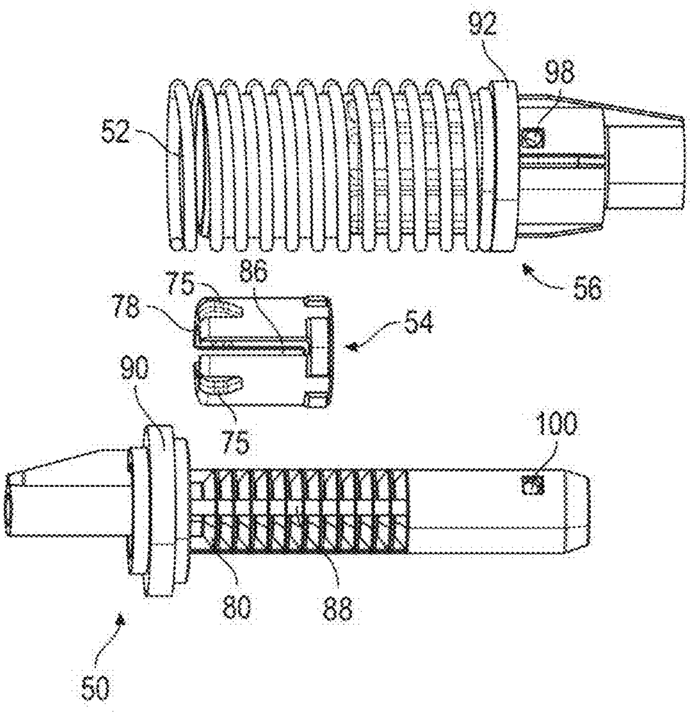
FIG. 4 is another exploded view of the tensioner illustrated in FIG. 3.
Figure 5:
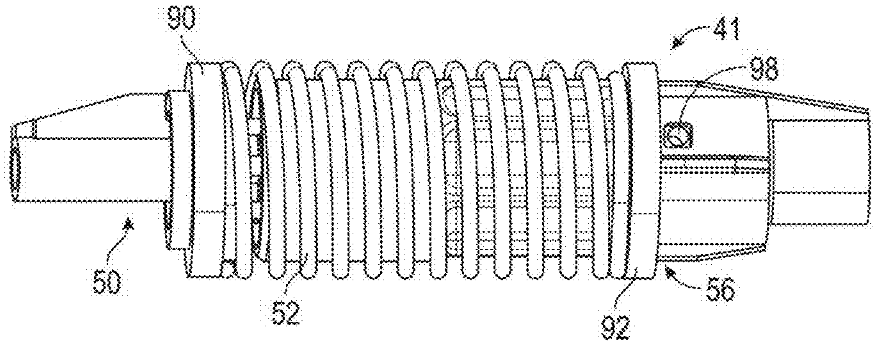
FIG. 5 is a view of the tensioner illustrated in FIG. 3.

FIG. 2B is a perspective view of the single lift window regulator 16. The single lift window regulator includes a guide rail 18 having a cursor 20 that is slidably secured to it. Cursor 20 is configured to be secured to the window 14 and is operably coupled to at least one cable or a pair of cables.

Guide rail 18 of the window regulator 16 may have an upper pulley or upper cam 24 that is secured. The upper pulley or upper cam is configured to receive either rotationally or slidably a cable. For example, a first cable 22 is secured to cursor 20 at one end and a cable drum 28 at an opposite end and a second cable 23 is secured to the cursor 20 at one end and the cable drum 28 at an opposite end. Alternatively, and as mentioned above, only one cable secured to the cursors 20 and the drum 28.

The cable drum 28 is rotationally mounted to a housing 30. To provide rotational movement to the cable drum 28, a motor 32 is operably coupled to the cable drum 28 by for example a worm drive (not shown) that is rotated by the motor 32. In one embodiment, the housing 30 is not secured either guide rail 18.

The guide rail 18 also have a lower pulley or lower cam 34. As illustrated, the lower pulley or lower cam 34 is aligned with the guide rail 18. The lower pulley or lower cam 34 is configured to rotationally or slidably receive one of the cables.

As the cable drum 28 is rotated either the first cable 22 or second cable 23 will wind up on the cable drum 28 while the other unwinds thus causing movement of the cursor 20 in the directions of arrows 38. In addition, cable 27 which is not connected to the cable drum 28 will move accordingly. For example, the cable 27 is attached to a top portion of one cursor 20 at one end and a bottom portion of the other cursor 20 at its opposite end. Movement of the cursors 20 in the directions of arrows 38 will cause the window 14 to move up and down with respect to the vehicle door 12.

The window regulator 16 also includes a first cable sleeve 44 for the first cable 22 that extends guide rail 18 to the housing 30. In addition, a second cable sleeve 40 extends from the housing 30 guide rail 18. Still further, a third cable sleeve 42 extends from a rear guide rail 18" and forward guide rail 18'.

The first cable 22 is slidably received within the first cable sleeve 44, and the second cable 23 is slidably received in the second cable sleeve 40, and the third cable 27 is slidably received in the third cable sleeve 42. These cables 22, 23 and 27 and their associated cable sleeves 44, 40, and 42 are referred to as Bowden cables. The second cable sleeve 40 also includes a tensioner 41 such that slack in the second cable 23 is absorbed as is known in the related arts. For example and when the tension force given to lower cable or second cable 23 is higher than the load applied on the window regulator when moving the glass in lower direction (e.g., load applied on the window regulator in down direction=glass friction−glass load). As such, the tensioner 41 of the present disclosure complies with the requirement in all condition (climatic conditions) and for all window regulator life.

Not shown are a controller for controlling the motor 32 and inputs to the controller such as user operated switches, door ajar switch and a vehicle control module that may also provide input to the controller. Also not shown is an electric power supply system, which may include a battery and alternator as vehicle electric power supply systems and window controllers are well known in the art, these components are not discussed in further detail.

Referring now to FIGS. 3-7, a tensioner 41 in accordance with the present disclosure is illustrated. The tensioner 41 includes a first tensioner support 50, a spring 52, an adjusting sleeve 54 and a second tensioner support 56. The adjusting sleeve 54 is slidably mounted to the first tensioner support 50 and the spring 52 provides a biasing force between the first tensioner support 50 and the second tensioner support 56. In one non-limiting embodiment, the first tensioner support 50, the adjusting sleeve 54 and the second tensioner support 56 are formed from an easily moldable material such as plastic.

The adjusting sleeve 54 is partially received within a cavity 58 of the second tensioner support 56. The adjusting sleeve 54 also has a protrusion 60 that is configured to slide within a recess 70 located within an inner surface 72 of the cavity 58. The configuration of the recess 70 and protrusion defines a range of movement of the adjusting sleeve 54 with respect to the second tensioner support 56 when the adjusting sleeve 54 is partially received within cavity 58. This range of movement allows for a predetermined amount of slack prior to the tensioner 41 irreversibly adjusting to a longer length. For example, this predetermined amount of slack may be referred to as an offset to keep a frameless window sealed in case one side of window does not reach the top such that the tensioner does not irreversible remove this predetermined amount of slack. The predetermined amount of slack is defined by a range of movement of protrusion 60 within recess 70. The inner surface 72 of the cavity 58 is angled towards recess 70 such that when the adjusting sleeve 54 is inserted into cavity 50 the protrusion 60 will be received within recess 70 via an interference fit. The protrusion 60 also has a first surface 62 and a second surface 64. The recess 70 also has a first surface 71 and a second surface 73.

The adjusting sleeve 54 has a plurality of arm portions 74 each flexibly extending from a main body portion 76 of the adjusting sleeve 54. Each of the plurality of arm portions 74 has a hook portion 78 located at a distal end of the arm portion 74. The plurality of arm portions 74 are resilient so that they can be moved from a first position by a force and thereafter after removal of the force the plurality of arm portions return to the first position. The first tensioner support 50 has a plurality of angled teeth 80 that engage the hook portions 78 of each of the plurality of flexible arm portions 74 when they are in the first position. The hook portions 78 and the plurality of angled teeth 80 allow for the adjusting sleeve 54 to move in an extensible manner with respect to the first tensioner support 50 in the direction of arrow 82. Engagement of the hook portions 78 with a surface 84 of the plurality of angled teeth 80 prevents movement of the adjusting sleeve 54 in a direction opposite to arrow 82 with respect to the first tensioner support 50.

The cavity 58 also provides a limit or range of the movement of the plurality of arm portions 74 away from the plurality of angled teeth 80. This range of movement is dependent upon the position of the adjusting sleeve 54 with respect to the second tensioner support 56. For example and in one non-limiting embodiment, each of the plurality of arm portions 74 also has an outwardly extending protrusion 75 with an angled surface located proximate to a distal end of the arm portion 74. The angled surface of the outwardly extending protrusion 75 is configured to make contact with the angled surface of cavity 58 in order to provide the limit of movement of the plurality of arm portions 74 away from the plurality of angled teeth 80. This range of movement (e.g., away from the teeth 80) may depend on the position of protrusion 60 within recess 70 as this will determine the position of the angled surface of the outwardly extending protrusion 75 with respect to the angled surface of cavity 58.

For example, and in one non-limiting embodiment, when the second surface 73 of the recess 70 of the second tensioner support 56 contacts the second surface 64 of the protrusion 60 of the adjusting sleeve 54, a larger portion of the angled surface of the outwardly extending protrusions 75 is received within cavity 58 as opposed to when the first surface 71 of the recess 70 of the second tensioner support 56 contacts the first surface 62 of the protrusion 60 of the adjusting sleeve 54. When the larger portion of the angled surface of the outwardly extending protrusions 75 is received within cavity 58 the cavity provides a lesser amount or lesser range of movement of the plurality of arm portions 74 away from the plurality of angled teeth 80 then when the first surface 71 of the recess 70 of the second tensioner support 56 contacts the first surface 62 of the protrusion 60 of the adjusting sleeve 54. In this position (e.g., first surface 62 contacts first surface 71) the cavity 58 allows for a larger range of movement of the plurality of arm portions 74 away from the plurality of angled teeth 80 than when the second surface 64 contacts the second surface 73. This being due to the relevant position of the angled surfaces of the outwardly extending protrusions 75 with respect to the angled surface of the cavity 58.

Figure 6:
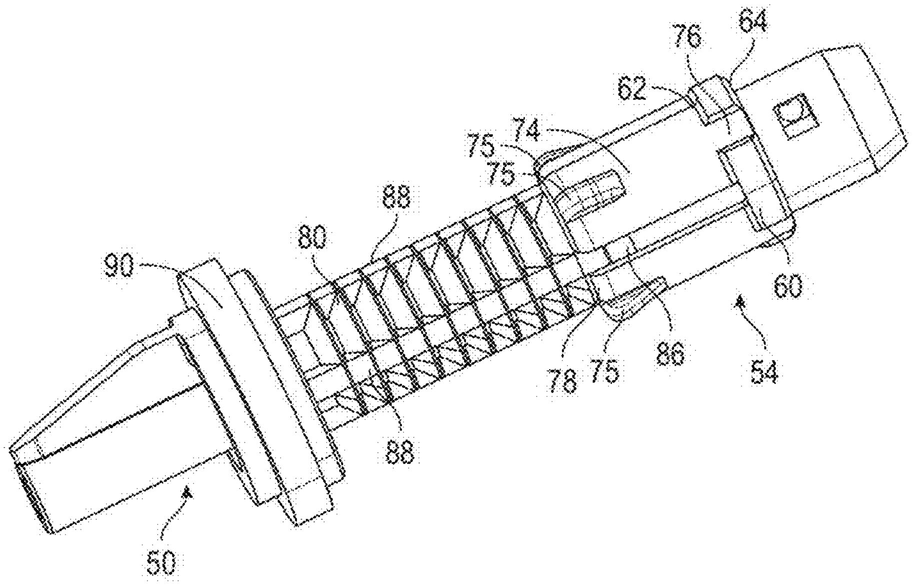
FIG. 6 is a perspective view of the tensioner illustrated in FIG. 3 without a spring and a second tensioner support.
Figures 6A, 6B, 6C:
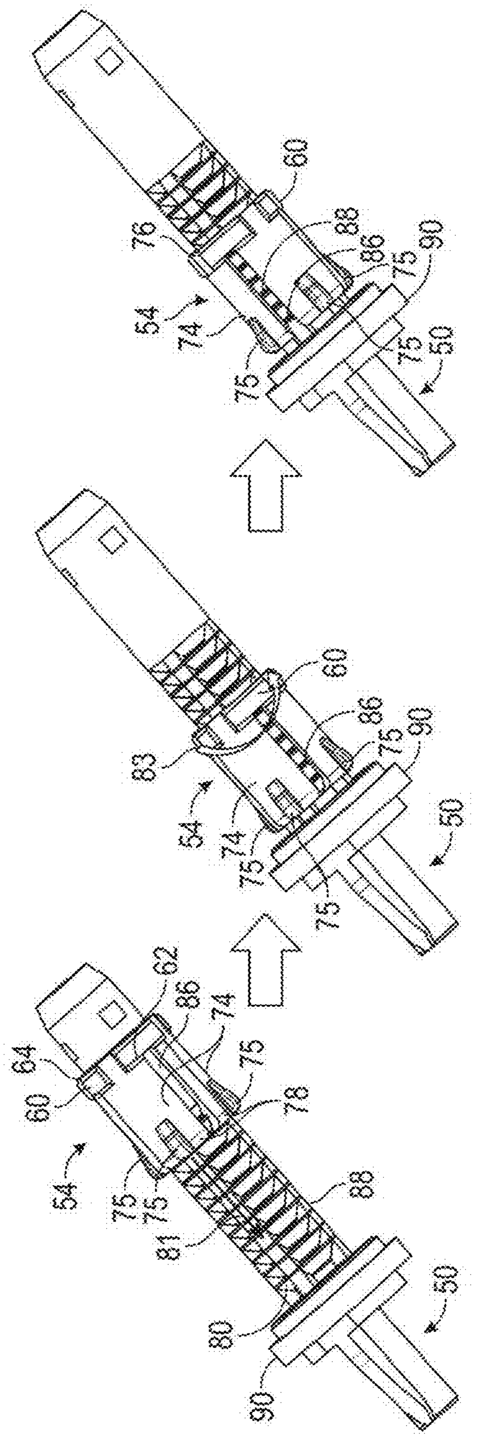
FIGS. 6A-6C illustrate installation of an adjusting sleeve on the tensioner support.

Each of the plurality of flexible arm portions 74 are separated by slots 86 that receive features 88 located between the plurality of angled teeth 80 when the adjusting sleeve 54 is secured and/or assembled to the first tensioner support 50. See for example, FIGS. 6A-6C. During assembly of the adjusting sleeve 54 to the first tensioner support 50, the hook portions 78 are aligned to engage the tops of features 88 such that hook portions 78 do not engage the plurality of angled teeth 80 such that the adjusting sleeve 54 can slide onto the first tensioner support 50 in the direction of arrow 81. Thereafter, once the adjusting sleeve 54 is in the desired location (FIG. 6B), the adjusting sleeve 54 is rotated in the direction of arrow 83 until the flexible arm portions drop onto the plurality of angled teeth 80 in between features 88 such that features 88 are received in slots 86. When assembled, the spring 52 makes contact with a flange 90 of the first tensioner support 50 and a flange 92 of the second tensioner support 56. In one non-limiting embodiment, a gasket 91 is located between flange 92 and spring 52. When the tensioner 41 is assembled as illustrated in at least FIG. 7, the spring 52 is compressed and the spring 52 makes contact with the flange 90 of the first tensioner support 50 and the flange 92 of the second tensioner support 56 such that a biasing force is applied in the direction of arrows 94.

Figure 7:
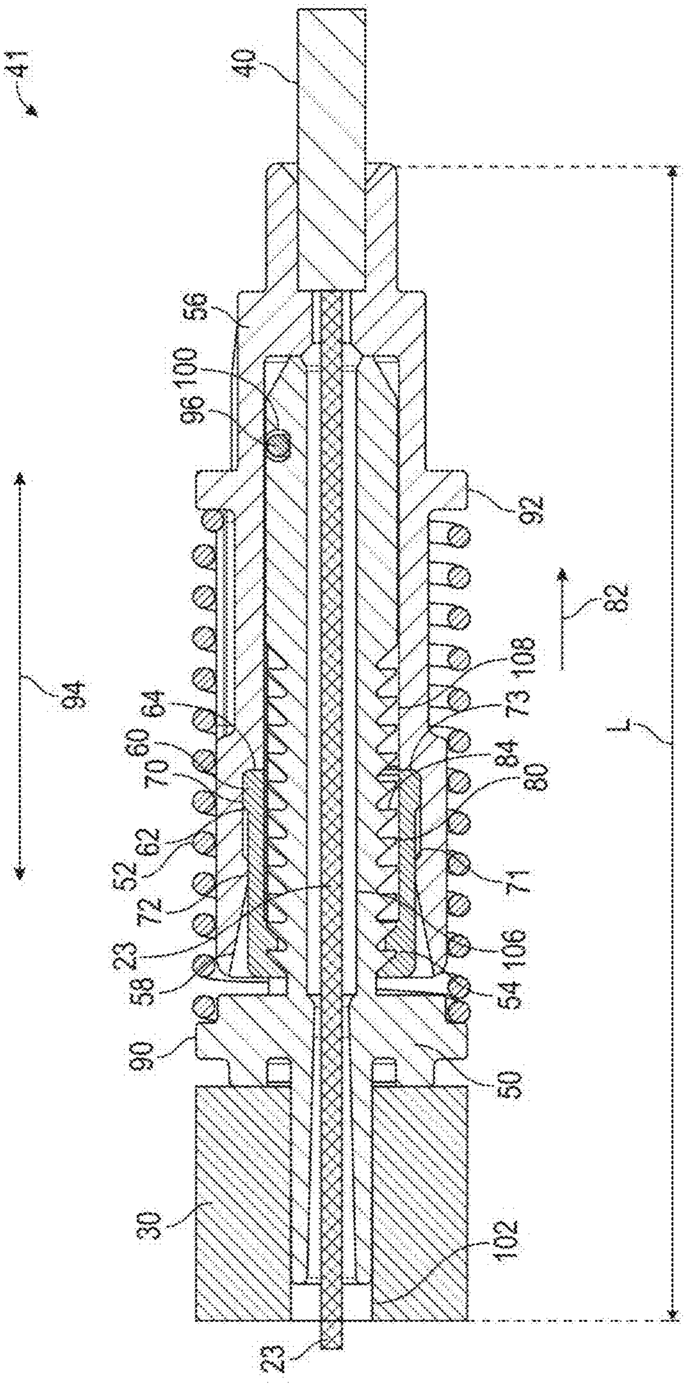
FIG. 7 is a cross-sectional view of the tensioner illustrated in FIG. 3.
Figure 8:
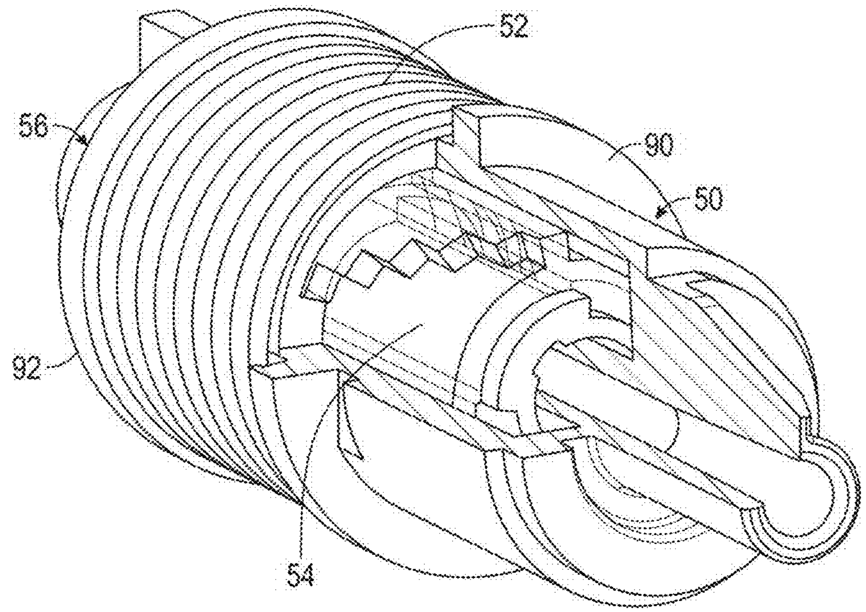
FIG. 8 is a perspective partial cross-sectional view of a tensioner in accordance with an alternative embodiment of the present disclosure.
Figure 9:
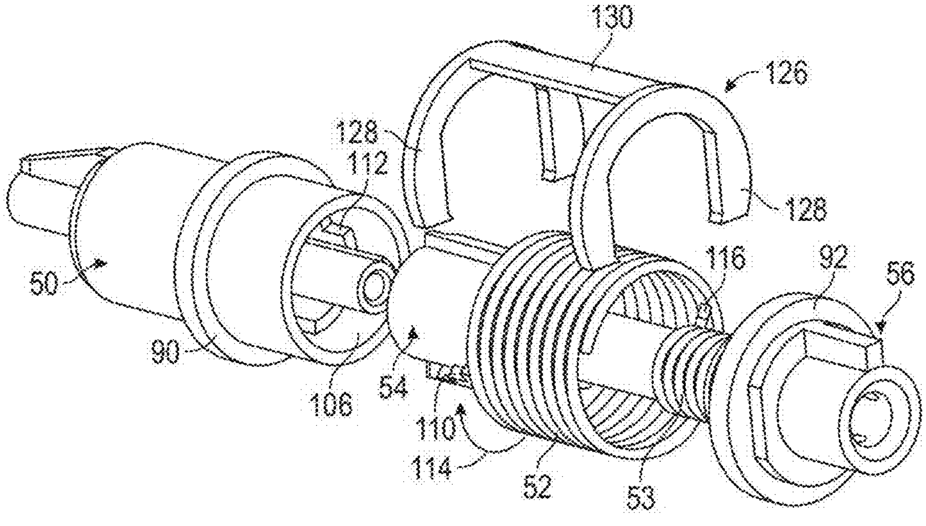
FIG. 9 is an exploded view of the tensioner illustrated in FIG. 8.
Figure 10:
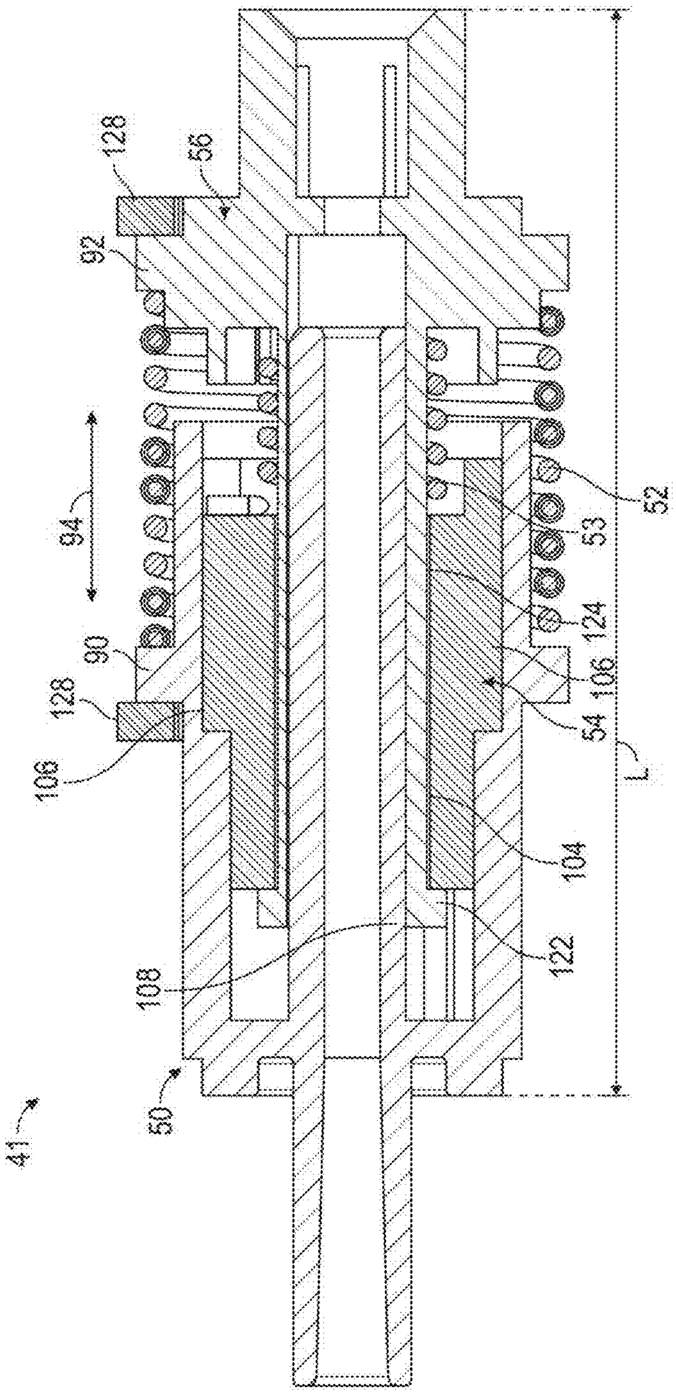
FIG. 10 is a cross-sectional view of the tensioner illustrated in FIG. 8.
Figure 11B:
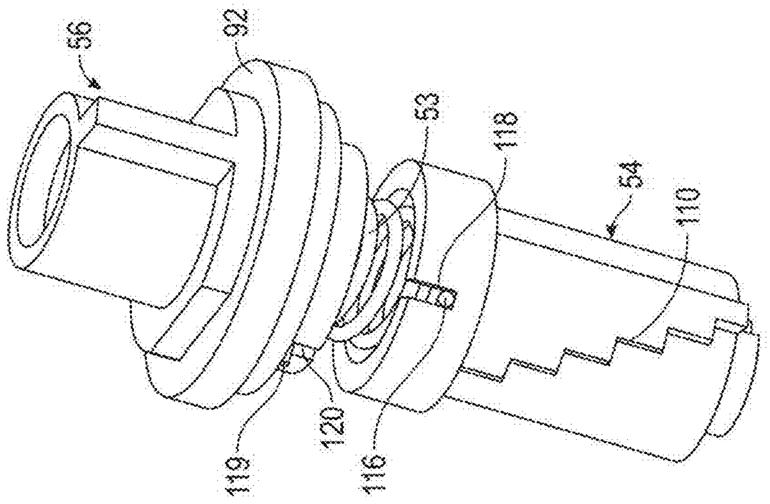
FIG. 11B is a perspective view of portions of the tensioner illustrated in FIG. 8.
Figure 11A:
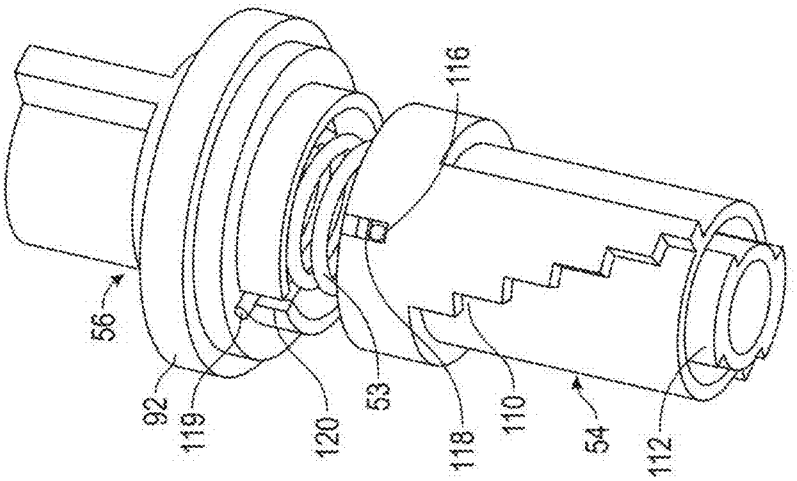
FIG. 11A is a perspective view of portions of the tensioner illustrated in FIG. 8.
Figure 14:
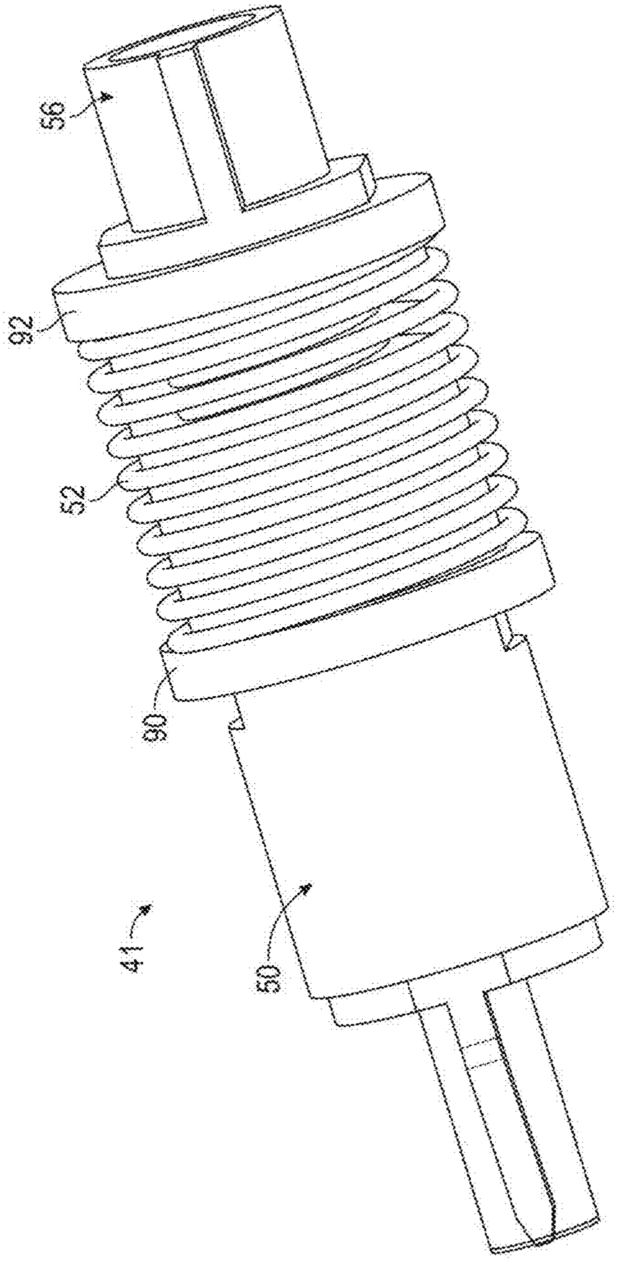
FIG. 14 is a perspective view of the tensioner illustrated in FIG. 8.
Figure 15:
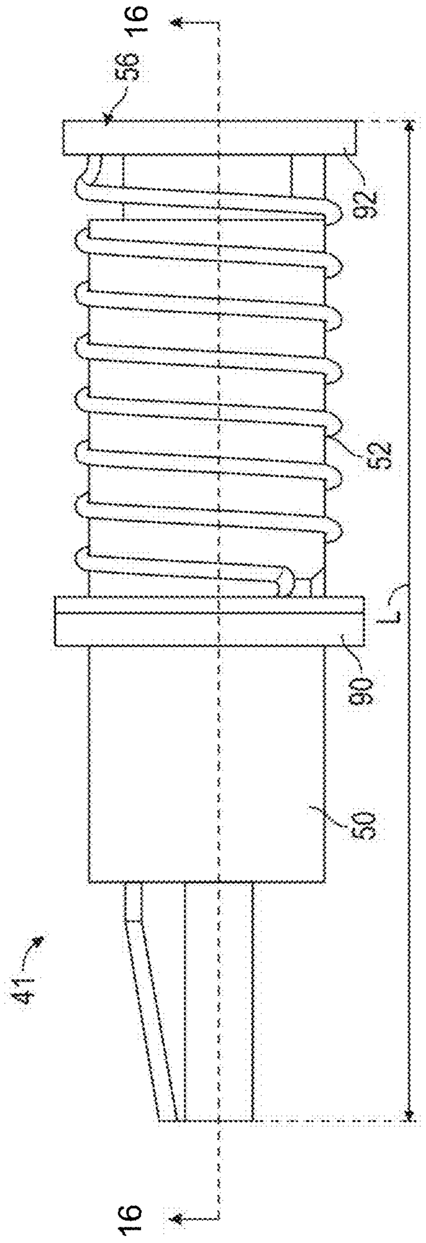
FIG. 15 is a side view of a tensioner in accordance with yet another embodiment.
Figure 16:
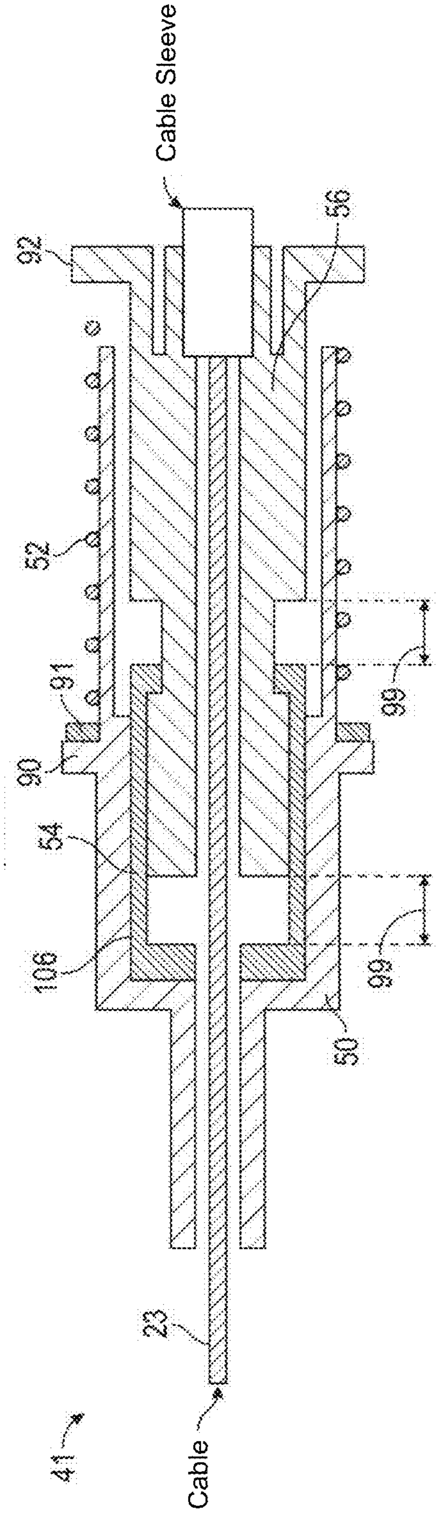
FIG. 16 is a cross-sectional view of the tensioner illustrated in FIG. 15.
Figures 17, 17A, 17B:
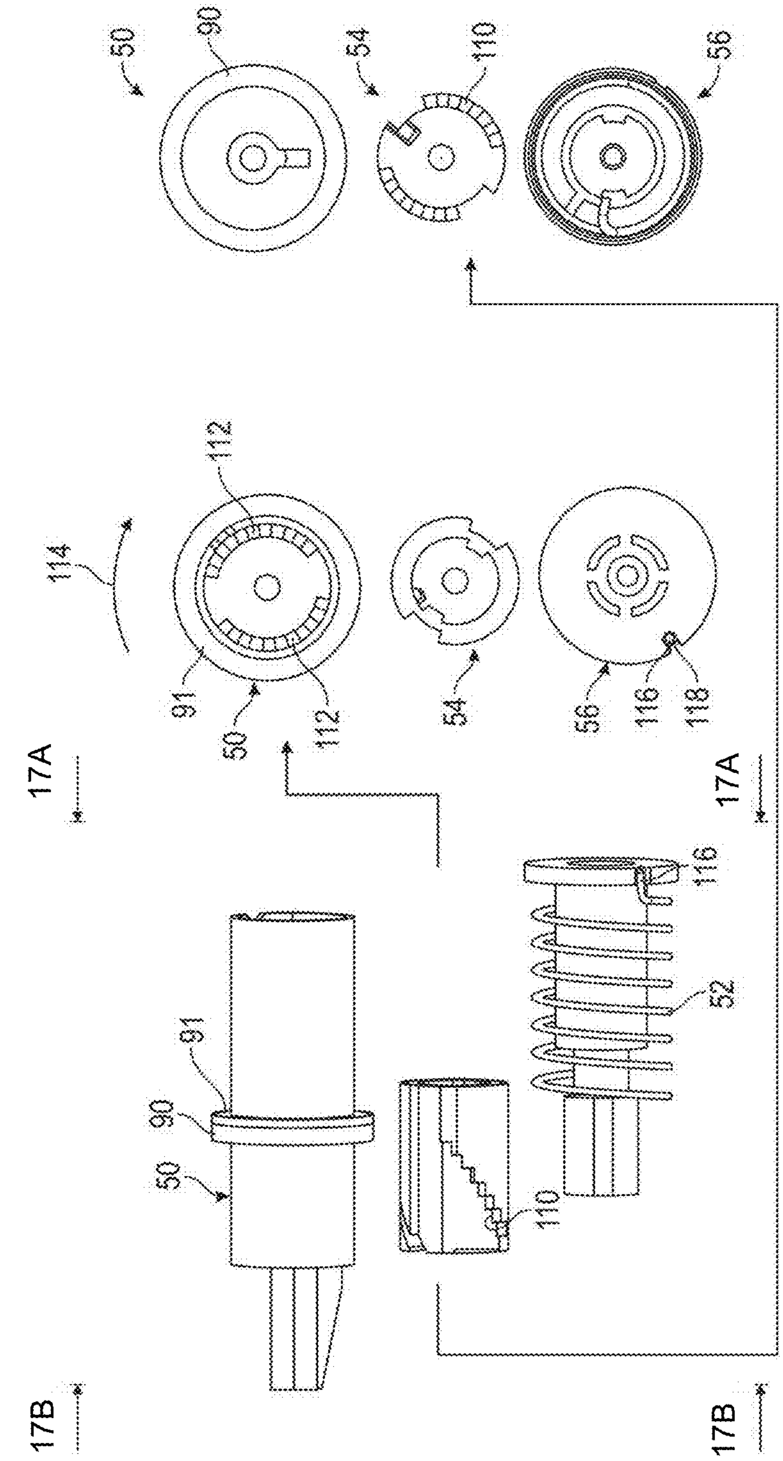
FIG. 17 is an exploded view of portions of the tensioner illustrated in FIG. 16.
FIG. 17A is an end view of FIG. 17.
FIG. 17B is an opposite end view of FIG. 17.
Figure 18C:
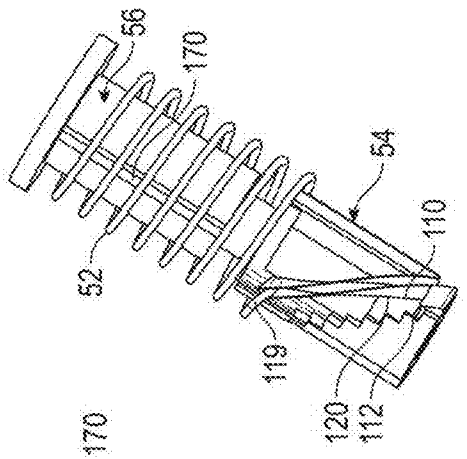
FIG. 18C is a perspective view of portions of the tensioner illustrated in FIG. 15.
Figure 18B:
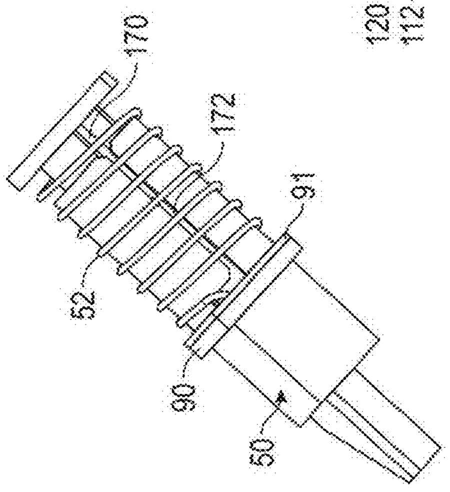
FIG. 18B is a perspective view of portions of the tensioner illustrated in FIG. 15.
Figure 18A:
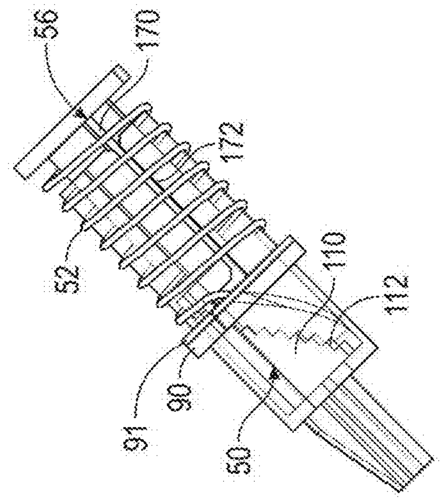
FIG. 18A is a perspective view of portions of the tensioner illustrated in FIG. 15 wherein the first tensioner support is illustrated in phantom.
Figure 19A:
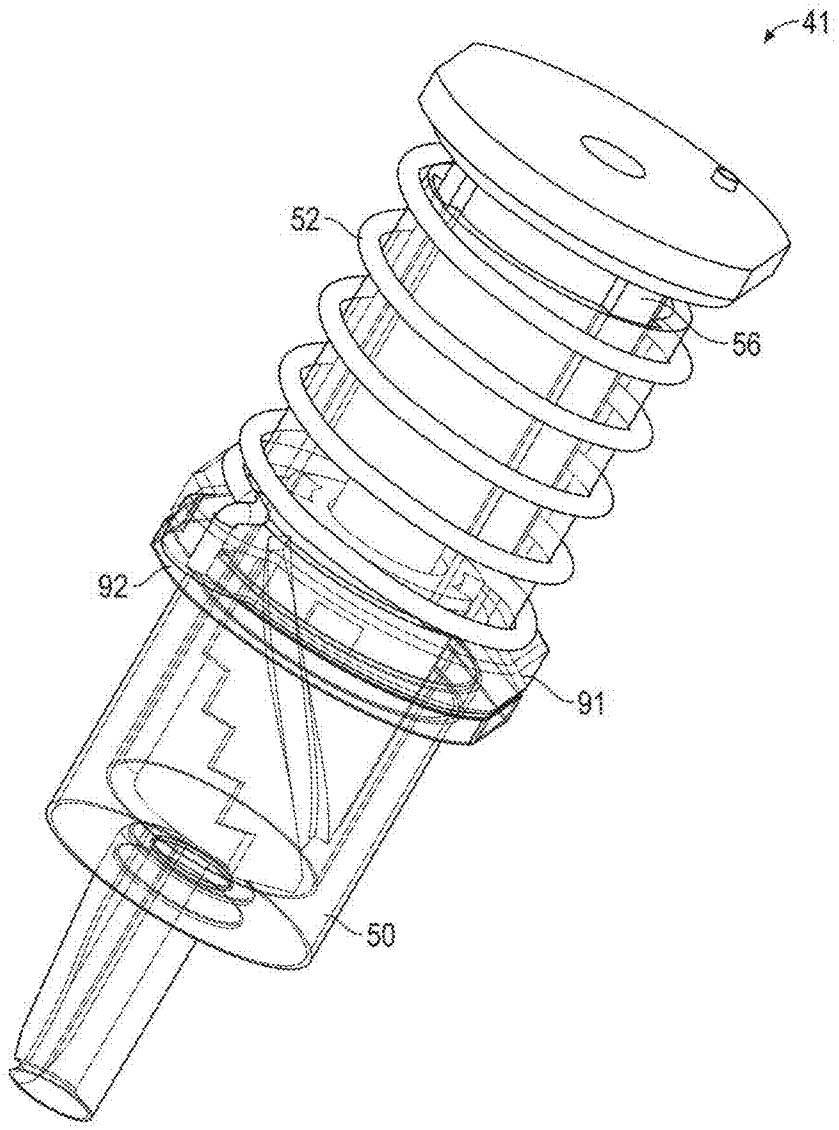
FIG. 19A is a perspective view of a tensioner in accordance with yet another embodiment wherein the first tensioner support is illustrated in phantom.
Figure 19B:
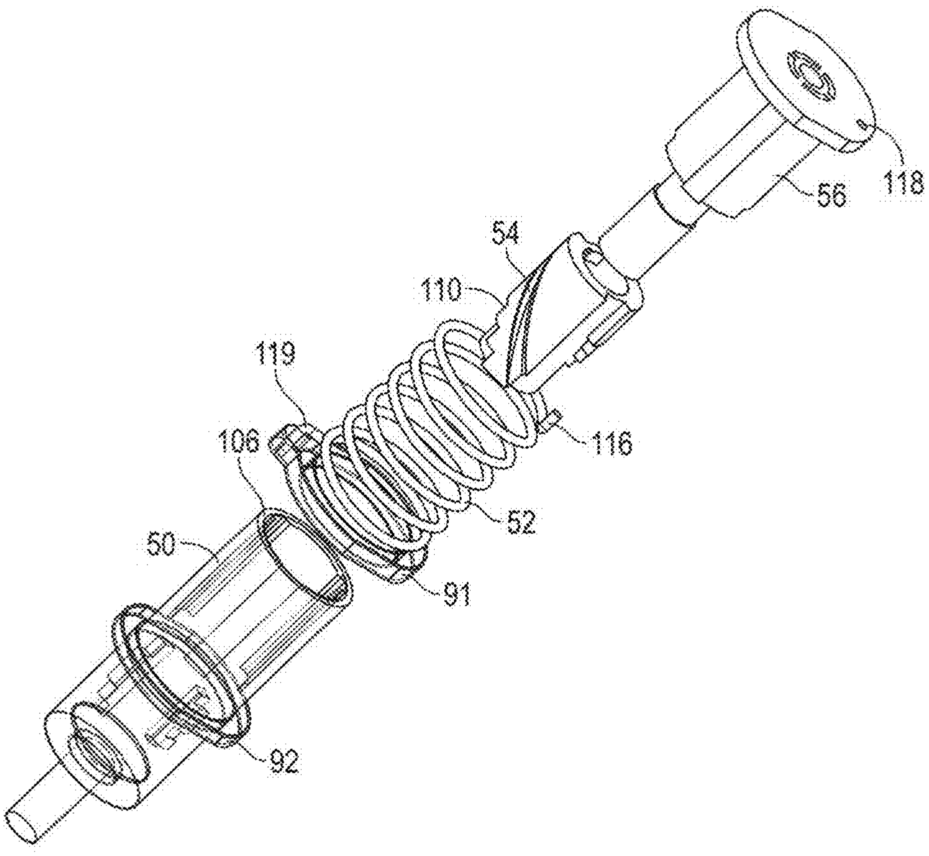
FIG. 19B is an exploded view of the tensioner illustrated in FIG. 19A.
Figure 20:
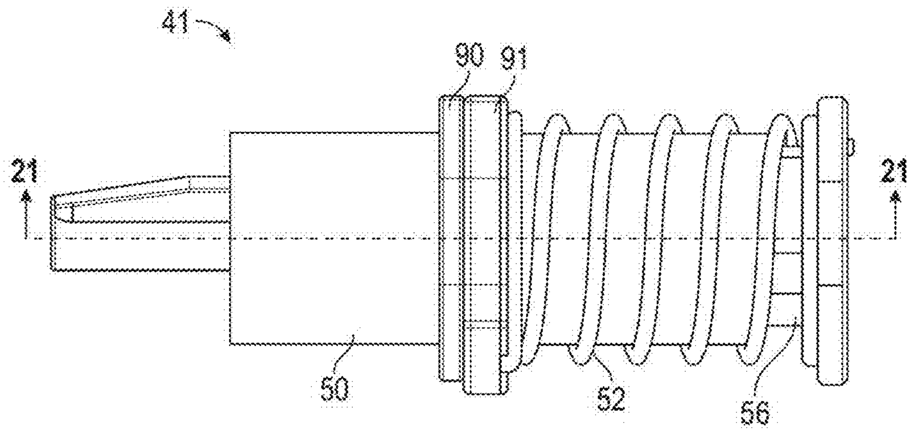
FIG. 20 is view of the tensioner illustrated in FIG. 19A.
Figure 21:
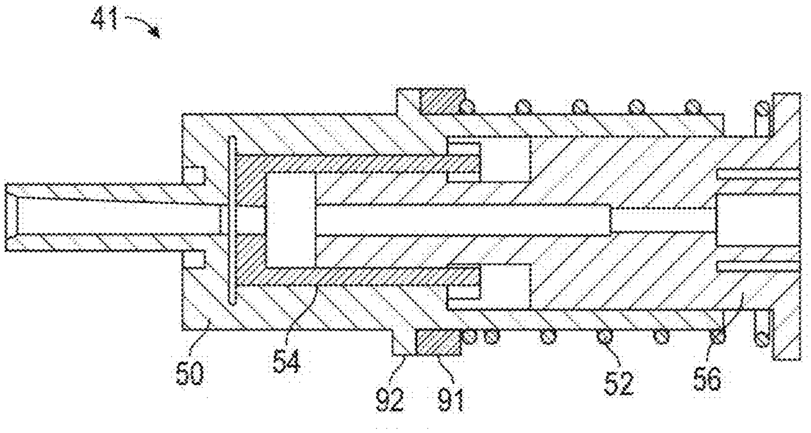
FIG. 21 is a cross-sectional view along lines 21-21 of FIG. 20.
Figure 22:
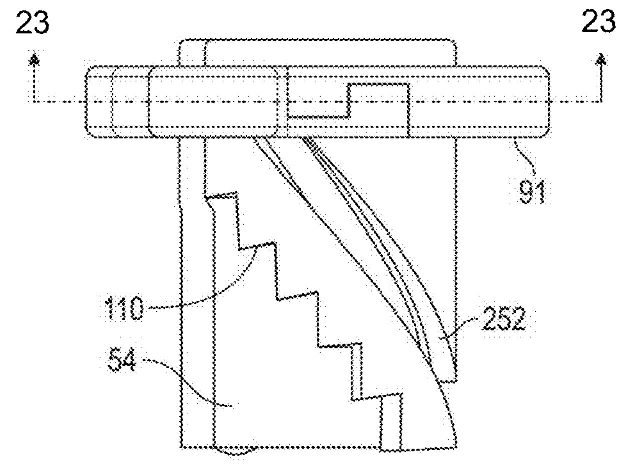
FIGS. 22-26 are views of components of the tensioner illustrated in FIG. 20.
Figure 23:
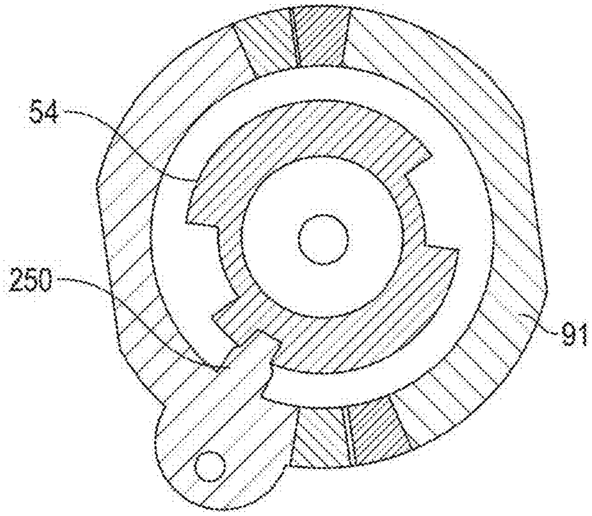
Figure 24:
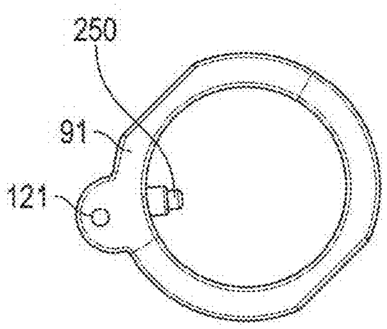
Figure 25:
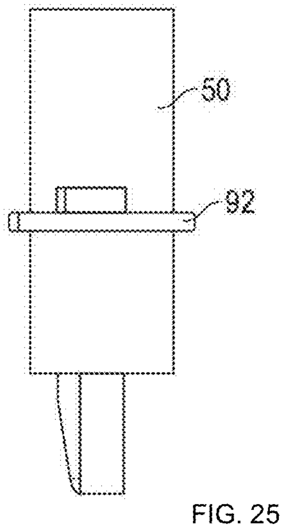
Figure 26:
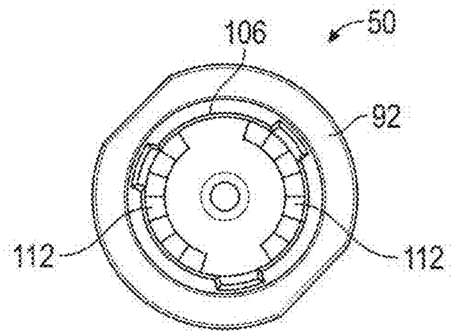

In order to retain the tensioner 41 and spring 52 in the compressed state as illustrated in at least FIG. 7, retaining pin 96 is inserted into an opening 98 in the second tensioner support 56 and engages a groove or recess 100 located in the first tensioner support 50. Thereafter and once, the tensioner 41 is installed in its desired location, the pin 96 is removed and the spring force in the direction of arrows 94 is applied.

As such, and if there slack in a cable 23, as mentioned above, the slack will be taken up as flanges 90 and 92 will move away from each other due to the biasing force of spring 52 in the direction of arrows 94 and the hook portions 78 of each of the plurality of arm portions 74 engage one of the plurality of angled teeth 80 of the first tensioner support 50.

FIG. 7 also illustrates the tensioner 41 secured to housing 30 by for example, a portion of the first tensioner support 50 being received within a complementary opening 102 of the housing 30. The cavity 58 and the opening 108 of the second tensioner support 56 slidably receives the first tensioner support 50 relatively. The first tensioner support 50 also defines an opening 106. Opening 106 and opening 108 define a path for cable 23 to slide therethrough. Therefore, the tensioner 41 provides an apparatus and method for taking up cable slack.

Referring now to FIGS. 8-14, an alternative embodiment of the present invention is illustrated, here the adjusting sleeve 54 is rotationally received within opening 106 of the first tensioner support 50 and the adjusting sleeve 54 has a plurality of step features 110 that engage complimentary step features 112 located on the inner surface of opening 106. As such and as the adjusting sleeve 54 rotates with respect to the first tensioner support 50 in the direction of arrow 114 and as the second tensioner support 56 moves away from the first tensioner support 50 due to the biasing force of the first spring 52 in the direction of arrows 94, the length "L" of the tensioner 41 increases irreversibly due the configuration of step features 110 and 112 and their interaction with each other. As such, the slack in the cable 23 is taken up.

In order, to provide the rotational force to the adjusting sleeve 54 in the direction of arrow 114, a second spring 53 is provided. In one embodiment, the second spring 53 is a torsion spring wherein one end 116 engages an opening 118 in the adjusting sleeve 54 and an opposite end 119 of the second spring 53 engages an opening 120 in second tensioner support 56.

The adjusting sleeve 54 is also rotationally received on the second tensioner support 56. The portion 104 of the second tensioner support 56 has a key configuration 122 that allows it to be inserted into an opening 124 of the adjusting sleeve 54. The key configuration 122 allows the portion 104 of the second tensioner support 56 to slide into and through opening 124 and thereafter it is rotated so that the adjusting sleeve 54 is retained on the key configuration 122. This rotation also provides a biasing force to second spring 53 since ends 116 and 119 are received in complementary openings 118 and 120 as second tensioner support 56 is rotated with respect to the adjusting sleeve 54. The biasing force of the second spring 53 causes the required rotational movement of the adjusting sleeve 54 with respect to the first tensioner support 50. However, the tensioner 41 is configured such that the adjusting sleeve 54 will not slide off of portion 104 as it rotates due to the biasing force of the second spring 53.

In order to secure the first tensioner support 50, the adjusting sleeve 54 and the second tensioner support 56 together and compress spring 52, a tool 126 is provided. Tool 126 has a pair of yokes 128 connected by a central member 130. The pair of yokes 128 are configured to engage flanges 90 and 92 and the length of the central member 130 defines a initial compressed state of spring 52 when the pair of yokes 128 engage flanges 90 and 92.

Referring now to FIGS. 15-18C, yet another alternative embodiment of the present disclosure is illustrated. Here and similar to the embodiment illustrated in FIGS. 8-14, the adjusting sleeve 54 is rotationally received within opening 106 of the first tensioner support 50 and the adjusting sleeve 54 has a plurality of step features 110 that engage complimentary step features 112 located on the inner surface of opening 106. As such and as the adjusting sleeve 54 rotates with respect to the first tensioner support 50 in the direction of arrow 114 and as the second tensioner support 56 moves away from the first tensioner support 50 due to the biasing force of the spring 52 in the direction of arrows 94, the length "L" of the tensioner 41 increases irreversibly due the configuration of step features 110 and 112 and their interaction with each other. As such, the slack in the cable 23 is taken up.

In order to provide the rotational force to the adjusting sleeve 54 in the direction of arrow 114, spring 52 is a torsion spring wherein one end 116 engages an opening 118 in the second tensioner support 56 and an opposite end 119 of the spring 52 engages an elongated opening 120 in adjusting sleeve 54. The adjusting sleeve 54 is also rotationally received on the second tensioner support 56 while a feature 170 of the second tensioner support 56 is slidably received within an elongated opening 172 of the first tensioner support 50. This allows for linear movement of the first tensioner support 50 with respect to the second tensioner support 56 while preventing rotational movement with respect to each other thus the torsional biasing force of spring 52 causes rotational movement of the adjusting sleeve 54 with respect to the first tensioner support 50 so that irreversible lengthening of the tensioner in its length "L" is allowed in order to take up slack in cable 23. As such, and in this embodiment, spring 52 provides the dual functions of springs 52 and 53 of the embodiment illustrated in at least FIGS. 8-14.

Referring now to FIGS. 19A-26, yet another alternative embodiment of the present disclosure is illustrated. Here and similar to the embodiment illustrated in FIGS. 19-22C, the adjusting sleeve 54 is rotationally received within opening 106 of the first tensioner support 50 and the adjusting sleeve 54 has a plurality of step features 110 that engage complimentary step features 112 located on the inner surface of opening 106. As such and as the adjusting sleeve 54 rotates with respect to the first tensioner support 50 as the second tensioner support 56 moves away from the first tensioner support 50 due to the biasing force of the spring 52 in the direction of arrows 94, the length "L" of the tensioner 41 increases irreversibly due the configuration of step features 110 and 112 and their interaction with each other. As such, the slack in the cable 23 is taken up.

In order to provide the rotational force to the adjusting sleeve 54, spring 52 is a torsion spring wherein one end 116 engages an opening 118 in the second tensioner support 56 and an opposite end 119 of the spring 52 engages an opening 121 in gasket 91. The gasket 91 is located adjacent to flange 90 has a protrusion or feature 250 that engages the elongated opening 252 in a surface of the adjusting sleeve 54. The protrusion or feature 250 slides within the elongated opening 252 as the adjusting sleeve 54 rotates with respect to the first tensioner support 50. The adjusting sleeve 54 is also rotationally received on the second tensioner support 56. This allows for linear movement of the second tensioner support 56 with respect to the first tensioner support 50. The adjusting sleeve 54 will also be pulled away from the first tensioner support 50 by the second tensioner support 56 and the adjusting sleeve 54 will be rotated by spring 53 until step features 110 and 112 engage each other. This simultaneous rotational movement of the adjusting sleeve 54 with respect to the first tensioner support 50 irreversibly increases the length of the tensioner 41 due to the configuration of step features 110 and 112 and their interaction with each other. In addition and as in the previous embodiments, there is a slight range of movement between the adjusting sleeve 54 and the second tensioner support 56 (illustrated by arrows 99), which is provided by mutual interacting features of the adjusting sleeve 54 and the second tensioner support 56 that allow for a slight adjustment of the length "L" in either direction. As mentioned above, this slight range of movement allows for a predetermined amount of slack prior to the tensioner 41 irreversibly adjusting to a longer length. For example, this predetermined amount of slack may be referred to as an offset to keep a frameless window sealed in case one side of window does not reach the top such that the tensioner does not irreversible remove this predetermined amount of slack.

Referring now to FIGS. 27-30, a tensioner 41 in accordance with yet another embodiment is illustrated. The tensioner 41 includes a first tensioner support 50, a spring 52, an adjusting rack 55 and a second tensioner support 56. The adjusting rack 55 is slidably mounted to a recessed area 57 of the second tensioner support 56 and the spring 52 provides a biasing force between the first tensioner support 50 and the second tensioner support 56. The configuration of the recessed area 57 and adjusting rack 55 defines a range of movement of the adjusting rack 55 with respect to the second tensioner support 56 when the second tensioner support 56 is partially received within the first tensioner support 50. This range of movement allows for a predetermined amount of slack take up prior to the tensioner 41 irreversibly adjusting to a longer length. As mentioned above, this predetermined amount of slack may be referred to as an offset to keep a frameless window sealed in case one side of window does not reach the top such that the tensioner does not irreversible remove this predetermined amount of slack.

The tensioner 41 also has a spring biased tab portion 150 mounted to the first tensioner support 50. The spring biased tab portion 150 is configured to engage teeth 152 of the adjusting rack 55 in order to allow for an irreversible increase in the length "L" of the tensioner 41 which occurs when an end 154 of the adjusting rack 55 contacts a wall 156 of the recessed area 57. In one non-limiting embodiment, the spring biased tab portion 150 has an end 158 that is received within an opening 160 of the first tensioner support 50.

Figure 27:
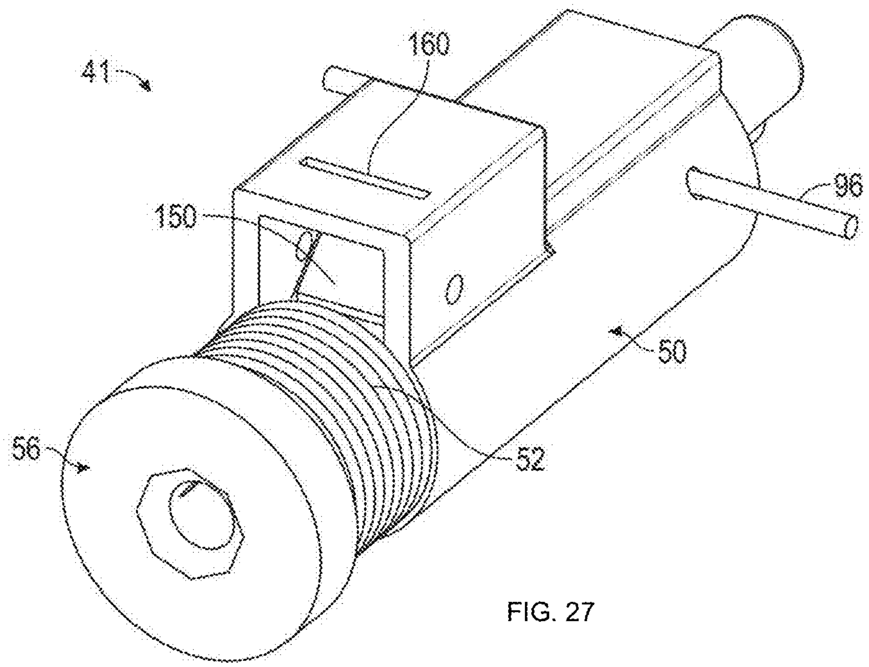
FIG. 27 is a perspective view of a tensioner in accordance with yet another embodiment.
Figure 28:
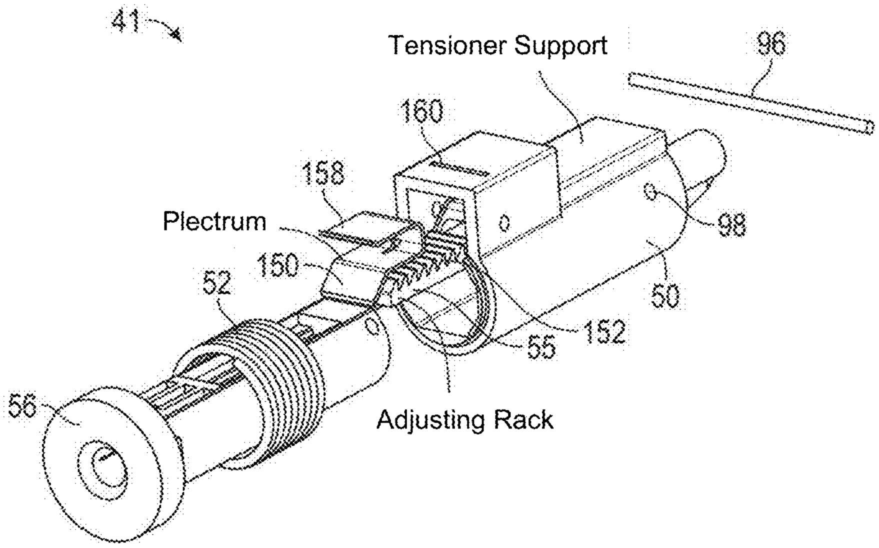
FIG. 28 is an exploded perspective view of the tensioner illustrated in FIG. 27.
Figure 29:
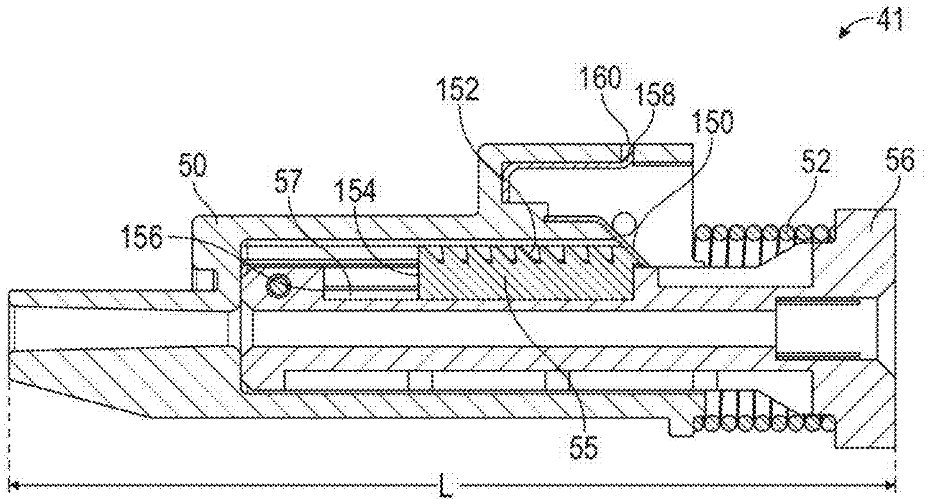
FIG. 29 is a cross-sectional view of the tensioner illustrated in FIG. 27.
Figure 30:
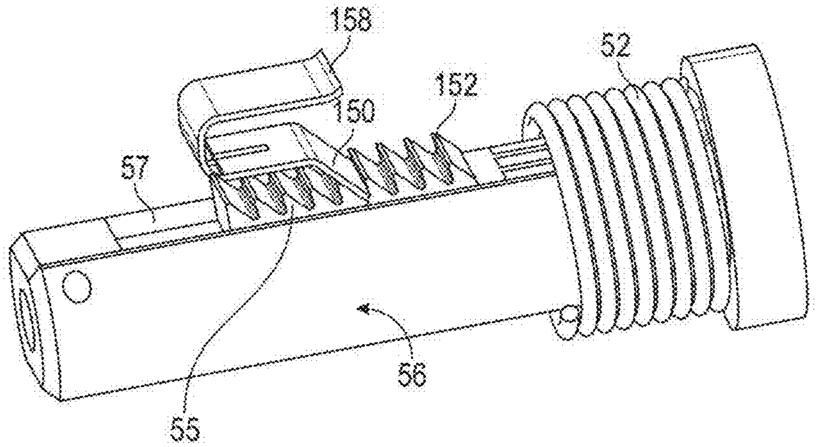
FIG. 30 is a perspective view of portions of the tensioner illustrated in FIG. 27.

In order to retain the tensioner 41 and spring 52 in the initial compressed state as illustrated in at least FIG. 27, a retaining pin 96 is inserted into an opening 98 of the first tensioner support 50 and engages an opening 100 located in the second tensioner support 56. Thereafter and once, the tensioner 41 is installed in its desired location the pin 96 is removed and the compressed biasing force of spring 52 is applied to the first tensioner support 50 and the second tensioner support 56.

As such, and if there slack in a cable 23, as mentioned above, the slack will be taken up as the first tensioner support 50 and the second tensioner support 56 will move away from each other due to the biasing force of spring 52 and the spring biased tab portion 150 mounted to the first tensioner support 50 will engage teeth 152 of the adjusting rack 55 in order to allow for an irreversible increase in the length "L" of the tensioner 41. It is noted that the spring biased tab portion 150 will only slide over teeth 152 after end 154 of the adjusting rack 55 contacts a wall 156 of the recessed area 57, thereafter the spring biased tab portion 150 will irreversibly move to the next tooth 152 of the adjusting rack 55.

Elements of the embodiments have been introduced with either the articles "a" or "an." The articles are intended to mean that there are one or more of the elements. The terms "including" and "having", and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A tensioner (41) for a window regulator (16) for raising and lowering a window (14) of a vehicle (10), comprising:
- a first tensioner support (50);
- a second tensioner support (56);
- a spring (52) disposed between the first tensioner support (50) and the second tensioner support (56); and
- an adjusting sleeve (54) configured to engage features of the first tensioner support (50) as the second tensioner support (56) is moved away from the first tensioner support (50) due to a biasing force of the spring (52).

2. The tensioner (41) as in claim 1, wherein the features of the first tensioner support (50) are a plurality of teeth (80) and the adjusting sleeve (54) has a plurality of arm portions (74) each flexibly extending from a main body portion (76) of the adjusting sleeve (54), each of the plurality of arm portions (74) has a hook portion (78) located at a distal end thereof.

3. The tensioner (41) as in claim 2, wherein each of the plurality of arm portions (74) are separated by slots (86) that receive features (88) located between the plurality of teeth (80).

4. The tensioner (41) as in claim 3, wherein a respective one of features (88) engages each hook portion (78) of the plurality of arm portions (74) such that the adjusting sleeve (54) can be slid onto the first tensioner support (50) and the adjusting sleeve (54) is rotationally received on the first tensioner support (50) until the adjusting sleeve (54) is rotated and the slots (86) receive features (88) and the hook portion (78) engages one of the plurality of teeth, the features (88) when received within the slots (86) prevent rotational movement of the adjusting sleeve (54) with respect to the first tensioner support (50).

5. The tensioner (41) as in claim 2, wherein the adjusting sleeve (54) is partially received within a cavity (58) of the second tensioner support (56) and the cavity (58) defines a limit of movement of the plurality of arm portions (74) away from the first tensioner support (50).

6. The tensioner (41) as in claim 2, wherein the adjusting sleeve (54) is partially received within a cavity (58) of the second tensioner support (56) and the adjusting sleeve (54) has a protrusion (60) that is configured to slide within a recess (70) located within an inner surface (72) of the cavity (58) of the second tensioner support (56), the protrusion (60) having a first surface (62) and a second surface (64), the recess (70) having a first surface (71) and a second surface (73), the sliding movement of the protrusion (60) within recess (70) defines a predefined range of movement between the second tensioner support (56) and the adjusting sleeve (54) before the tensioner (41) irreversibly adjusts to a longer length.

7. The tensioner (41) as in claim 6, wherein the spring (52) makes contact with a flange (90) of the first tensioner support (50) and a flange (92) of the second tensioner support (56) in order to bias the second tensioner support (56) away from the first tensioner support (50).

8. The tensioner (41) as in claim 1, wherein the adjusting sleeve (54) is rotationally received within an opening (106) of the first tensioner support (50) and the adjusting sleeve (54) has a plurality of step features (110) that engage complimentary step features (112) located on an inner surface of opening (106).

9. The tensioner (41) as in claim 8, wherein the spring (52) is a first spring and the adjusting sleeve (54) is provided with a rotational biasing force by a second spring (53).

10. The tensioner (41) as in claim 9, wherein the second spring (53) is a torsion spring and one end (116) of the torsion spring (53) engages an opening (118) in the adjusting sleeve (54) and an opposite end (119) of the second spring (53) engages an opening (120) in the second tensioner support (56).

11. The tensioner (41) as in claim 10, wherein a portion (104) of the second tensioner support (56) has a key configuration (122) that allows it to be inserted into and through an opening (124) of the adjusting sleeve (54) and thereafter rotational movement of the key configuration (122) prevents the key configuration (122) from sliding back into opening (124).

12. The tensioner (41) as in claim 1, wherein the adjusting sleeve (54) is rotationally received within an opening (106) of the first tensioner support (50) and the adjusting sleeve (54) has a plurality of step features (110) that engage complimentary step features (112) located on an inner surface of opening (106) and a rotational force is applied to the adjusting sleeve (54) by the spring (52).

13. The tensioner (41) as in claim 12, wherein one end (116) of the spring (52) engages an opening (118) in the second tensioner support (56) and an opposite end (119) of the spring (52) engages an elongated opening (120) in the adjusting sleeve (54).

14. The tensioner (41) as in claim 13, wherein the adjusting sleeve (54) is also rotationally received on the second tensioner support (56) while a feature (170) of the second tensioner support (56) is slidably received within an elongated opening (172) of the first tensioner support (50) which allows for linear movement of the second tensioner support (56) with respect to the first tensioner support (50) while preventing rotational movement of the second tensioner support (56) with respect to the first tensioner support (50).

15. The tensioner (41) as in claim 1, further comprising a gasket (91) secured to the first tensioner support and the adjusting sleeve (54) is rotationally received within an opening (106) of the first tensioner support (50) and the adjusting sleeve (54) has a plurality of step features (110) that engage complimentary step features (112) located on an inner surface of opening (106) and where the gasket has a feature (250) that slides within an elongated opening (252) in a surface of the adjusting sleeve (54) as the adjusting sleeve (54) rotates with respect to the first tensioner support (50).

16. A tensioner (41) for a window regulator (16) for raising and lowering a window (14) of a vehicle (10), comprising:

a first tensioner support (50);

a second tensioner support (56);

a spring (52) disposed between the first tensioner support (50) and the second tensioner support (56);

an adjusting rack (55) slidably mounted to a recessed area (57) of the second tensioner support (56); and a spring biased tab portion (150) mounted to the first tensioner support (50) the spring biased tab portion (150) configured to engage teeth (152) of the adjusting rack (55) in order to allow for an irreversible increase in the a length of the tensioner (41) when an end (154) of the adjusting rack (55) contacts a wall (156) of a receiving area (57).

17. A tensioner (41) as in claim 16, wherein the spring biased tab portion (150) has an end (158) that is received within an opening (160) of the first tensioner support (50).

18. A window regulator (16), comprising:

at least one guide rail (18);

at least one cursor (20) slidably mounted to the at least one guide rail (18);

at least cable (23) operably coupled to the at least one cursor (20) at one end and a cable drum (28) at an opposite end;

at least one cable sleeve (40) surrounding the at least one cable (23), the at least one cable (23) slidably received within the at least one cable sleeve (40);

a motor (32) mounted to a housing (30), the motor (30) operably coupled to the cable drum (28) such that operation of the motor (32) will rotate the cable drum and cause movement of the at least one cursor (20) along the at least one guide rail (18);

a tensioner (41) located between the housing (30) and the at least one cable sleeve (40), the tensioner comprising:

a first tensioner support (50);

a second tensioner support (56);

a spring (52) disposed between the first tensioner support (50) and the second tensioner support (56); and an adjusting sleeve (54) configured to engage features of the first tensioner support (50) as the second tensioner support (56) is moved away from the first tensioner support (50) due to a biasing force of the spring (52).

* * * * *